United States Patent
Shiokawa et al.

(10) Patent No.: US 11,624,424 B2
(45) Date of Patent: Apr. 11, 2023

(54) ROTATION DRIVING DEVICE

(71) Applicant: MIKUNI CORPORATION, Tokyo (JP)

(72) Inventors: Hisashi Shiokawa, Kanagawa (JP); Daiki Ihara, Kanagawa (JP); Shota Yagoh, Kanagawa (JP); Katsushi Takami, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/578,399

(22) Filed: Jan. 18, 2022

(65) Prior Publication Data

US 2022/0316560 A1 Oct. 6, 2022

(30) Foreign Application Priority Data

Mar. 31, 2021 (JP) .............................. JP2021-061722

(51) Int. Cl.
| | | |
|---|---|---|
| *H02K 5/02* | (2006.01) | |
| *F16H 57/02* | (2012.01) | |
| *F16H 1/32* | (2006.01) | |
| *F16H 57/021* | (2012.01) | |
| *H02K 5/173* | (2006.01) | |

(Continued)

(52) U.S. Cl.
CPC .............. *F16H 1/32* (2013.01); *F16H 57/021* (2013.01); *H02K 5/1732* (2013.01); *H02K 7/083* (2013.01); *H02K 7/116* (2013.01); *H02K 11/215* (2016.01); *F16H 2057/02034* (2013.01); *F16H 2057/02082* (2013.01)

(58) Field of Classification Search
CPC .................. F16H 1/32; F16H 57/021; F16H 2057/02034; F16H 57/032; F16H 2057/0325; F16H 2001/327; H02K 5/1732; H02K 7/083; H02K 7/116; H02K 11/215; H02K 5/02
See application file for complete search history.

(56) References Cited

U.S. PATENT DOCUMENTS 6,857,981 B2 * 2/2005 Hori ...................... H02K 5/225
475/149
6,981,478 B2 * 1/2006 Schafer .................. H02K 7/116
123/90.31

(Continued)

FOREIGN PATENT DOCUMENTS

DE 202006014817 U1 * 1/2007 ........... B60N 2/0232
JP 2009063043 A * 3/2009
(Continued)

*Primary Examiner* — Sherry L Estremsky
(74) *Attorney, Agent, or Firm* — JCIPRNET

(57) ABSTRACT

A rotation driving device includes: a body 10, made of resin, and having an accommodation hole 13 in a cylindrical shape with an axis S as a center; a motor M, comprising a rotor 60 provided in an accommodation hole of the body and rotating around the axis and a rotation shaft 40 integrally rotating around the axis with the rotor and extending in an axial direction; a first bearing B1 fixed to an end side of the body and a second bearing B2 fixed to the other end side of the body in the axial direction, so as to rotatably support the rotation shaft; and a first cover member 110 connected to the one end side of the body and a second cover member 120 connected to the other end side of the body.

16 Claims, 16 Drawing Sheets

(51) Int. Cl.
    *H02K 7/116*     (2006.01)
    *H02K 11/215*    (2016.01)
    *H02K 7/08*      (2006.01)

(56) References Cited

U.S. PATENT DOCUMENTS

| | | | | |
|---|---|---|---|---|
| 7,326,143 | B2* | 2/2008 | Kimura | H02K 7/116 |
| | | | | 475/155 |
| 8,647,226 | B2* | 2/2014 | Kume | F16H 1/32 |
| | | | | 475/170 |
| 8,772,991 | B2* | 7/2014 | Yamamoto | F16H 57/0006 |
| | | | | 310/83 |
| 9,303,728 | B2* | 4/2016 | Kume | F16H 57/023 |
| 9,926,929 | B2* | 3/2018 | Takahashi | F04C 11/008 |
| 10,502,305 | B2* | 12/2019 | Kume | F16H 61/32 |
| 10,819,184 | B2* | 10/2020 | Uematsu | H02K 11/33 |
| 11,255,431 | B2* | 2/2022 | Cho | H02K 5/1732 |
| 2014/0128192 | A1* | 5/2014 | Korenaga | B60K 17/14 |
| | | | | 475/5 |
| 2017/0366064 | A1* | 12/2017 | Kawaguchi | H02K 5/161 |
| 2020/0006991 | A1* | 1/2020 | Yamagata | H02K 1/278 |

FOREIGN PATENT DOCUMENTS

| | | | | |
|---|---|---|---|---|
| JP | 2020150608 | | 9/2020 | |
| JP | 2020178422 | | 10/2020 | |
| WO | WO-2012128003 | A1 * | 9/2012 | B60K 17/046 |
| WO | WO-2018179833 | A1 * | 10/2018 | H02K 1/146 |

* cited by examiner

ROTATION DRIVING DEVICE

CROSS-REFERENCE TO RELATED APPLICATION

This application claims the priority benefit of Japan application serial no. 2021-061722, filed on Mar. 31, 2021. The entirety of the above-mentioned patent application is hereby incorporated by reference herein and made a part of this specification.

BACKGROUND

Technical Field

The invention relates to a rotation driving device including a rotation shaft integrally rotating with a rotor, and particularly relates to a rotation driving device including an output part of a deceleration unit on the same axis with the rotation shaft.

Description of Related Art

As a conventional rotation driving device, a rotation-type actuator including a housing, a motor having a stator and a rotor, a rotation shaft (motor shaft) integrally rotating with the rotor, a deceleration mechanism provided on the rotation shaft, and an output shaft provided in parallel with the rotation shaft to be decelerated by the deceleration mechanism and rotate is known (see, for example, Patent Document 1).

Here, the housing includes an upper case part in a cylindrical shape and accommodating the motor, a lower case part connected with the upper case part to cover the deceleration mechanism provided in adjacency with the motor, and a plate cover connected with the upper case to cover a control substrate on a side opposite to the lower case part.

In the device, a bearing supporting an end part of the rotation shaft is provided in the upper case part, and a bearing supporting the other end part of the rotation shaft is provided in the lower case part. Therefore, due to the variation of assembly between the upper case part and the lower case part, there is a concern that the rotation shaft is installed to be inclined. In addition, since an end part of the output shaft is supported by the upper case part and the other end part thereof is supported by the lower case part, due to the variation of assembly between the upper case part and the lower case part, there is also a concern that the output shaft is installed to be inclined.

Moreover, assuming the above configuration, when the configuration in which the output shaft and the rotation shaft are provided on the same axis, the dimension of the device in the axial direction of the rotation shaft is increased.

As another rotation driving device, an electric driving device including a housing, a motor including a stator and a rotor, a rotation shaft rotating integrally with the rotor, a transmission (planetary gear mechanism) provided on the same axis with the rotation shaft, a sub-housing connected with the housing to cover the transmission, and an output shaft provided on the same axis with the rotation shaft to be decelerated by the transmission and rotate is known (see, for example, Patent Document 2).

Here, the housing includes a cylindrical part accommodating the motor and two end plates jointed to an end side and the other end side of the cylindrical part to be fixed.

In the device, a bearing supporting an end part of the rotation shaft is provided in one of the end plates, and a bearing supporting the other end part of the rotation shaft is provided in the other end plate. Therefore, due to the variation of assembly between the cylindrical part and the two end plates, there is a concern that the rotation shaft is installed to be inclined.

In addition, by simply providing the transmission in adjacency with the housing, the dimension of the device in the axial direction of the rotation shaft is increased.

PRIOR ART LITERATURE

Patent Documents

Patent Document 1: Japanese Laid-open No. 2020-178422
Patent Document 2: Japanese Laid-open No. 2020-150608

SUMMARY

A rotation driving device according to an embodiment of the invention includes: a body, made of resin, and having an accommodation hole in a cylindrical shape with an axis as a center; a motor, including a rotor provided in the accommodation hole of the body and rotating around the axis and a rotation shaft integrally rotating around the axis with the rotor and extending in an axial direction; a first bearing fixed to one end side of the body and a second bearing fixed to the other end side of the body in the axial direction, so as to rotatably support the rotation shaft; and a first cover member connected to the one end side of the body and a second cover member connected to the other end side of the body.

According to an embodiment, in the rotation driving device, a configuration in which the body includes a first bearing holder embedded in the one end side and a second bearing holder pressed into the other end side, the first bearing is fit and fixed to the first bearing holder, and the second bearing is fit and fixed to the second bearing holder may also be adopted.

According to an embodiment, in the rotation driving device, a configuration in which the first bearing holder includes a first limiting part limiting a movement of the first bearing toward an outer side in the axial direction, and the second bearing holder includes a second limiting part limiting a movement of the second bearing toward the outer side in the axial direction may also be adopted.

According to an embodiment, in the rotation driving device, a configuration in which the rotation shaft includes a connection part outside the first bearing in the axial direction, and the rotation driving device further includes a deceleration unit provided between the first cover member and the body, and connected to the connection part to decelerate a speed of the rotation shaft may also be adopted.

According to an embodiment, in the rotation driving device, a configuration in which the connection part is an eccentric shaft part rotating eccentrically around the axis, and the deceleration unit includes an external gear connected to the eccentric shaft part to rotate and revolve around the axis, an internal gear partially engaged with the external gear, and an output rotation body interlocked with the external gear to rotate around the axis may also be adopted.

According to an embodiment, in the rotation driving device, a configuration in which a first washer, provided in adjacency with the first bearing to apply an urging force to the rotation shaft in the axial direction; and a second washer, provided in adjacency with the output rotation body to apply an urging force to the output rotation body in the axial direction may also be adopted.

According to an embodiment, in the rotation driving device, a configuration in which the internal gear is embedded and fixed to the one end side of the body may also be adopted.

According to an embodiment, in the rotation driving device, a configuration in which the external gear is rotatably supported by the eccentric shaft part via a third bearing may also be adopted.

According to an embodiment, in the rotation driving device, a configuration in which the output rotation body is supported to be rotatable around the axis with respect to the first cover member may also be adopted.

According to an embodiment, in the rotation driving device, a configuration in which the output rotation body is rotatably supported by the first cover member via a bush in a cylindrical shape may also be adopted.

According to an embodiment, in the rotation driving device, a configuration in which the external gear includes a first disc part in which external teeth engaged with the internal gear and a first engagement part engaged with the output rotation body are formed and a first cylindrical part integrally formed with the first disc part, the first disc part is provided in adjacency with a wall surface of the body on the one end side, and the first cylindrical part is formed to protrude outward from the first disc part in the axial direction may also be adopted.

According to an embodiment, in the rotation driving device, a configuration in which the output rotation body includes a second disc part which is provided in adjacency with the first disc part of the external gear in the axial direction and in which a second engagement part engaged with the first engagement part is formed, and a second cylindrical part integrally formed with the second disc part and provided to surround a periphery of the first cylindrical part may also be adopted.

According to an embodiment, in the rotation driving device, a configuration in which the first engagement part is a protrusion part protruding outward in the axial direction, and the second engagement part is an insertion hole into which the protrusion part is movably inserted may also be adopted.

According to an embodiment, in the rotation driving device, a configuration in which the output rotation body includes an output part rotating around the axis and connected to outside may also be adopted.

According to an embodiment, in the rotation driving device, a configuration in which the output part is fixed in adjacency to an outer side of the second cylindrical part in the axial direction may also be adopted.

According to an embodiment, in the rotation driving device, a configuration in which the output part is formed on an outer circumference of the second cylindrical part may also be adopted.

According to an embodiment, in the rotation driving device, a configuration in which a detected part is fixed to the rotation shaft in a region outside the second bearing in the axial direction, and the rotation driving device further includes a circuit substrate which is provided between the second cover member and the body, and in which a detection sensor detecting a rotation position of the rotation shaft via the detected part and a control circuit controlling driving of the motor are mounted may also be adopted.

DESCRIPTION OF THE EMBODIMENTS

Figure 1:
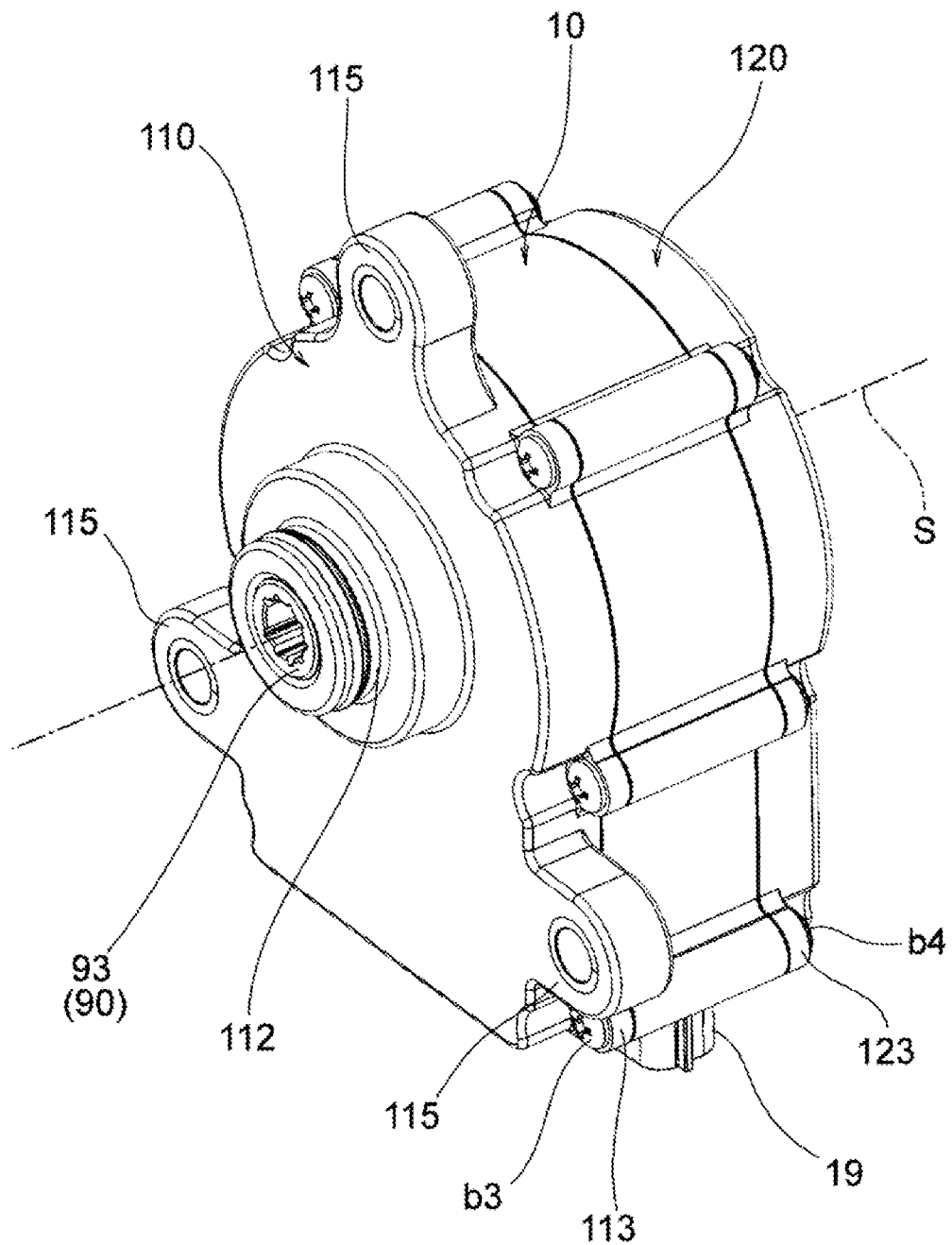
FIG. 1 is a perspective view illustrating the appearance of a rotation driving device according to a first embodiment of the invention.

The invention provides a rotation driving device preventing a rotation shaft of a motor from inclining while reducing the thickness and the volume of the device in an axial direction of the rotation shaft.

In the following, the embodiments of the invention will be described with reference to the accompanying drawings.

A rotation driving device according to a first embodiment, as shown in FIGS. 1 to 7, includes a body 10, a first bearing holder 20, a second bearing holder 30, a rotation shaft 40, a stator 50, a rotor 60, an internal gear 70, an external gear 80, an output rotation body 90, a circuit substrate 100, a first cover member 110, a second cover member 120, a first washer W1, and a second washer W2.

Here, the rotation shaft 40, the stator 50, and the rotor 60 form a three-phase brushless-type motor M. In addition, the internal gear 70, the external gear 80, and the output rotation body 90 form a deceleration unit which decelerates the rotation speed of the rotation shaft 40.

The body 10 is made of resin molded by using a resin material. As shown in FIGS. 3 and 10 to 12, the body 10 includes a wall surface 11 on one end side, a wall surface 12 on the other end side, an accommodation hole 13, an embedding part 14 in which the stator 50 is embedded, an embedding part 15 in which the first bearing holder 20 is embedded, a joining part 16 to which the second bearing holder 30 is joined, an embedding part 17 in which the internal gear 70 is embedded, a mounting part 18 to which the circuit substrate 100 is mounted, and a connector part 19.

The wall surface 11 on the one end side includes an end surface 11a of a region in which the stator 50 is embedded and a first joining surface 11b to which the first cover member 110 is joined in the direction of an axis S.

The first joining surface 11b is a region to which the first cover member 110 is joined and connected, and includes six screw holes 11b1 for screwing screws b3.

The wall surface 12 on the other end side, in the direction of the axis S, includes an end surface 12a of a region in which the stator 50 is embedded and a second joining surface 12b to which the second cover member 120 is joined.

The second joining surface 12b is a region to which the second cover member 120 is joined and connected, and includes six screw holes 12b1 for screwing screws b4.

Figure 9:
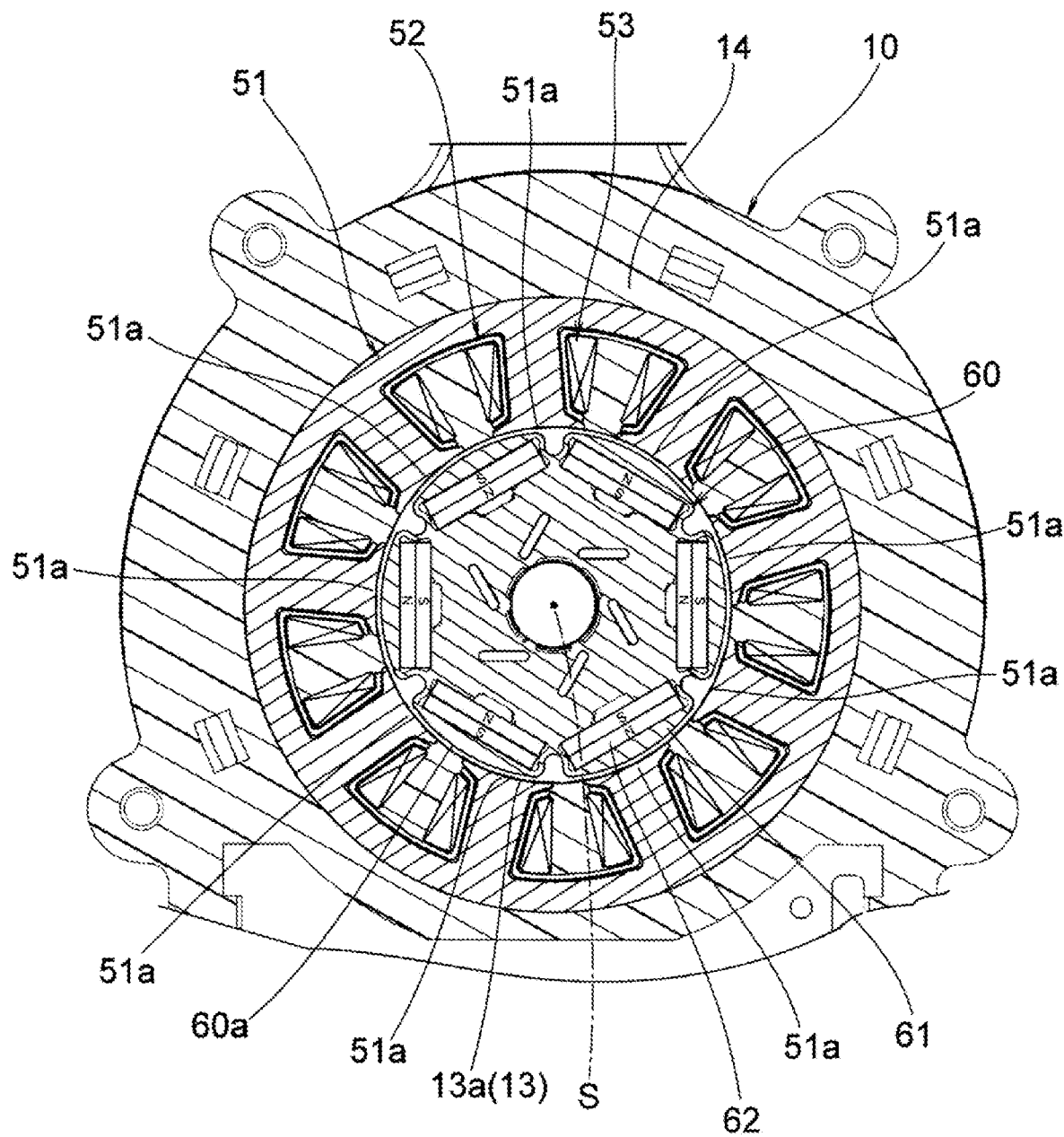
FIG. 9 is a cross-sectional view taken along a plane perpendicular to the axis and illustrating a stator embedded in the body and a rotor provided inner of the stator in the rotation driving device according to the first embodiment.
Figure 11:
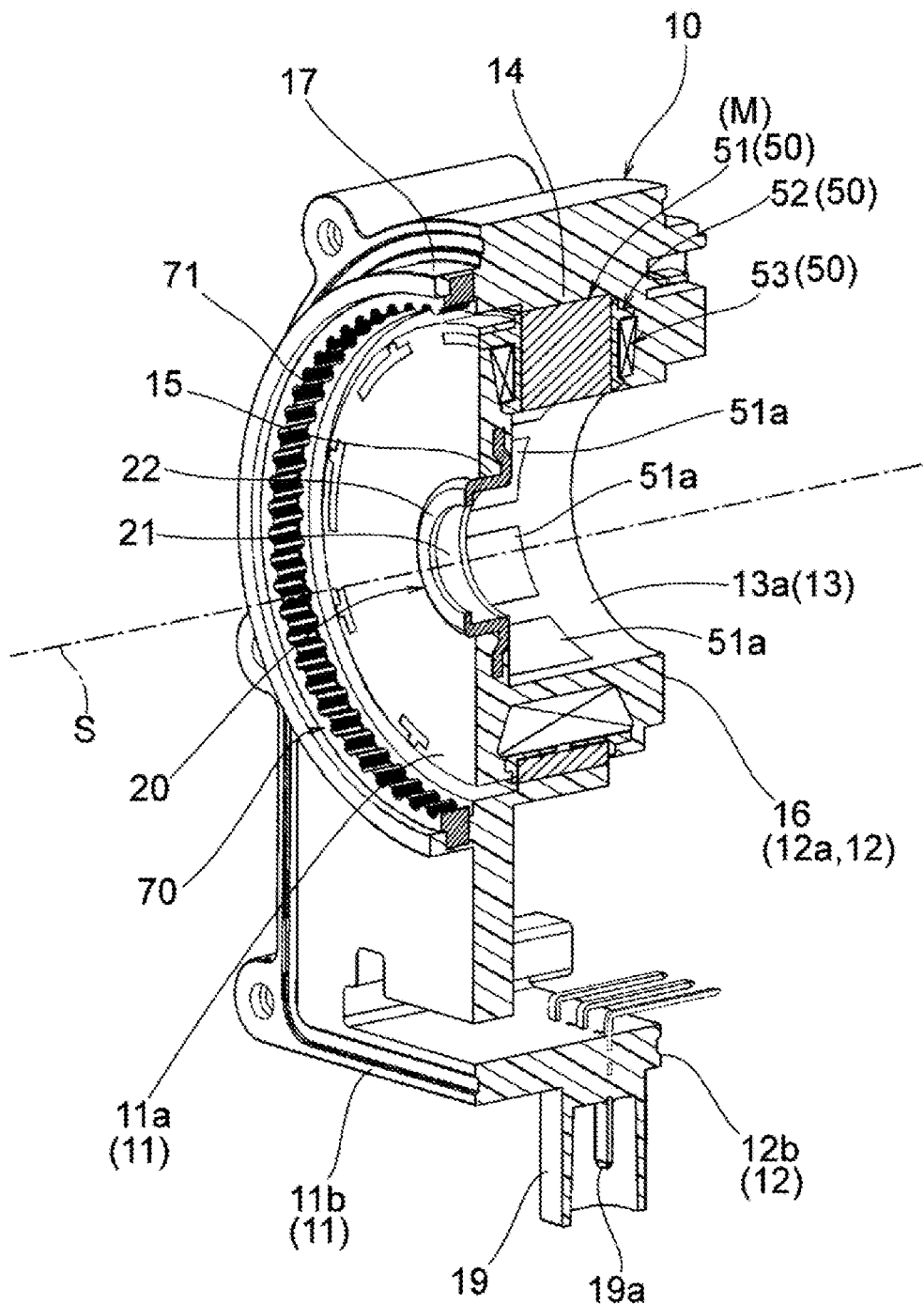
FIG. 11 is a perspective cross-sectional view illustrating the first bearing holder embedded in the body and an internal gear in the rotation driving device according to the first embodiment when viewed from the one end side of the body.
Figure 12:
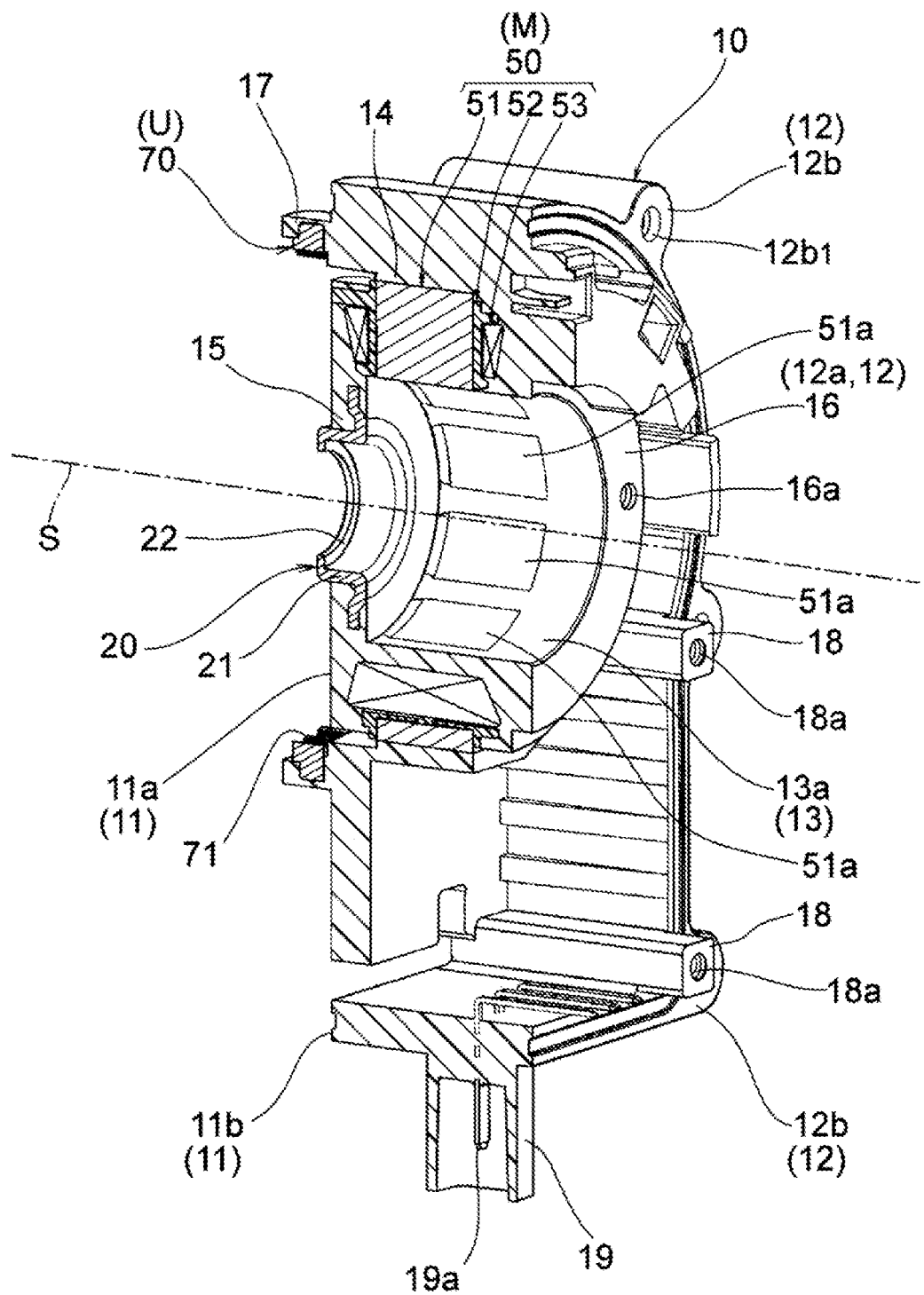
FIG. 12 is a perspective cross-sectional view illustrating the first bearing holder embedded in the body and the internal gear in the rotation driving device according to the first embodiment when viewed from the other end side of the body.

The accommodation hole 13 is formed in a cylindrical shape with the axis S being the center, and an inner circumferential surface 13a thereof, as shown in FIGS. 9, 11, and 12, is formed by exposed pole teeth 51a of the stator 50 together with a resin material. In addition, the accommodation hole 13 accommodates the rotor 60 without contact to be rotatable around the axis S.

The embedding part 14, as shown in FIGS. 9 to 12, embeds the stator 50, so that the nine pole teeth 51a of a stator core 51 are exposed on the inner circumferential surface 13a of the the accommodation hole 13, and a bobbin 52 and a coil 53 are covered by a resin material.

Figure 10:
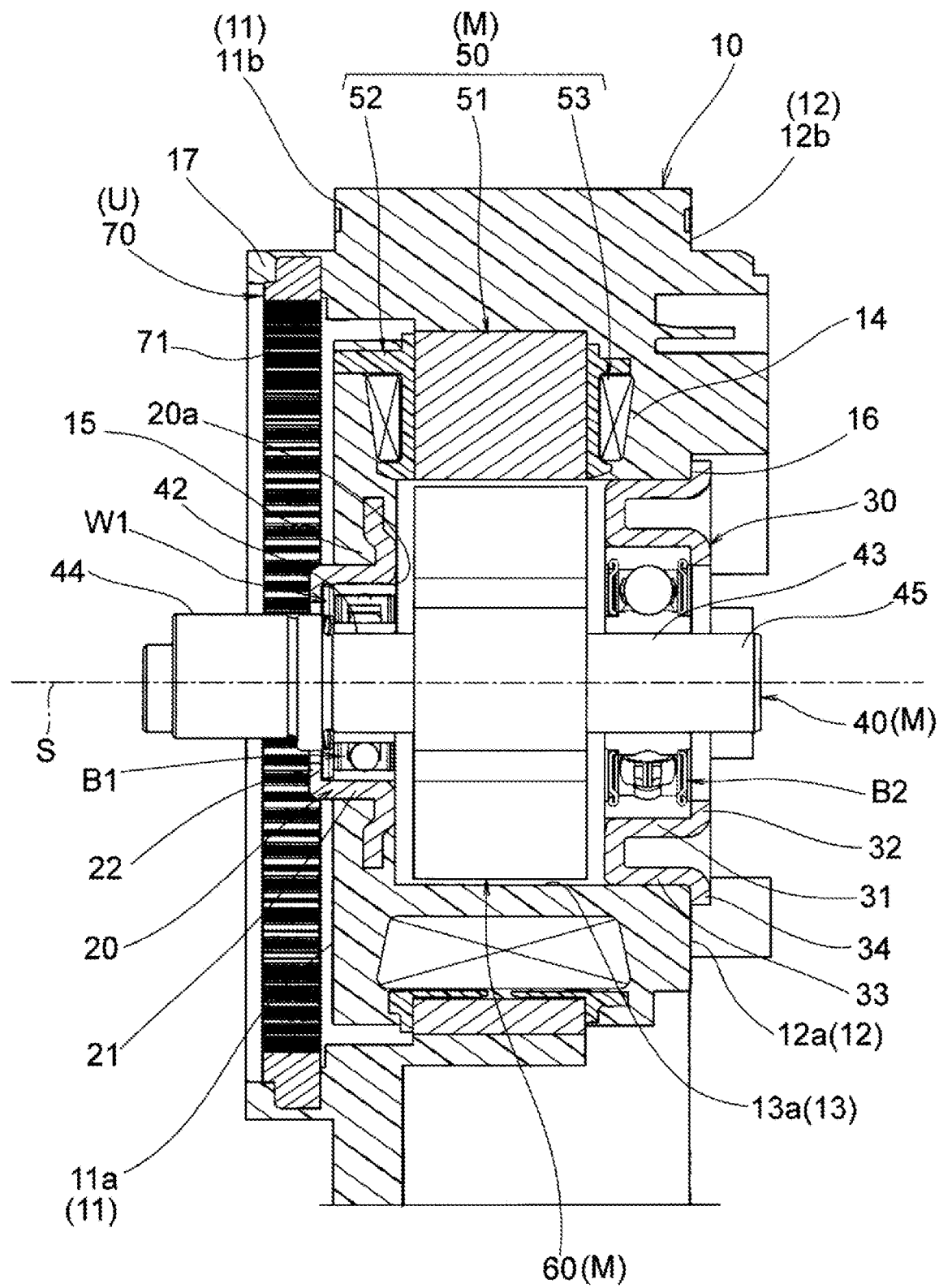
FIG. 10 is a cross-sectional view including the axis and illustrating the body, a first hearing holder, the first bearing, the second bearing holder, the second bearing, the rotor, and the rotation shaft in the rotation driving device according to the first embodiment.

The embedding part 15, as shown in FIG. 10, is near the wall surface 11 on the one end side and embeds the first bearing holder 20 to expose an inner wall surface 20a with which the first bearing B1 is fit.

Figure 7:
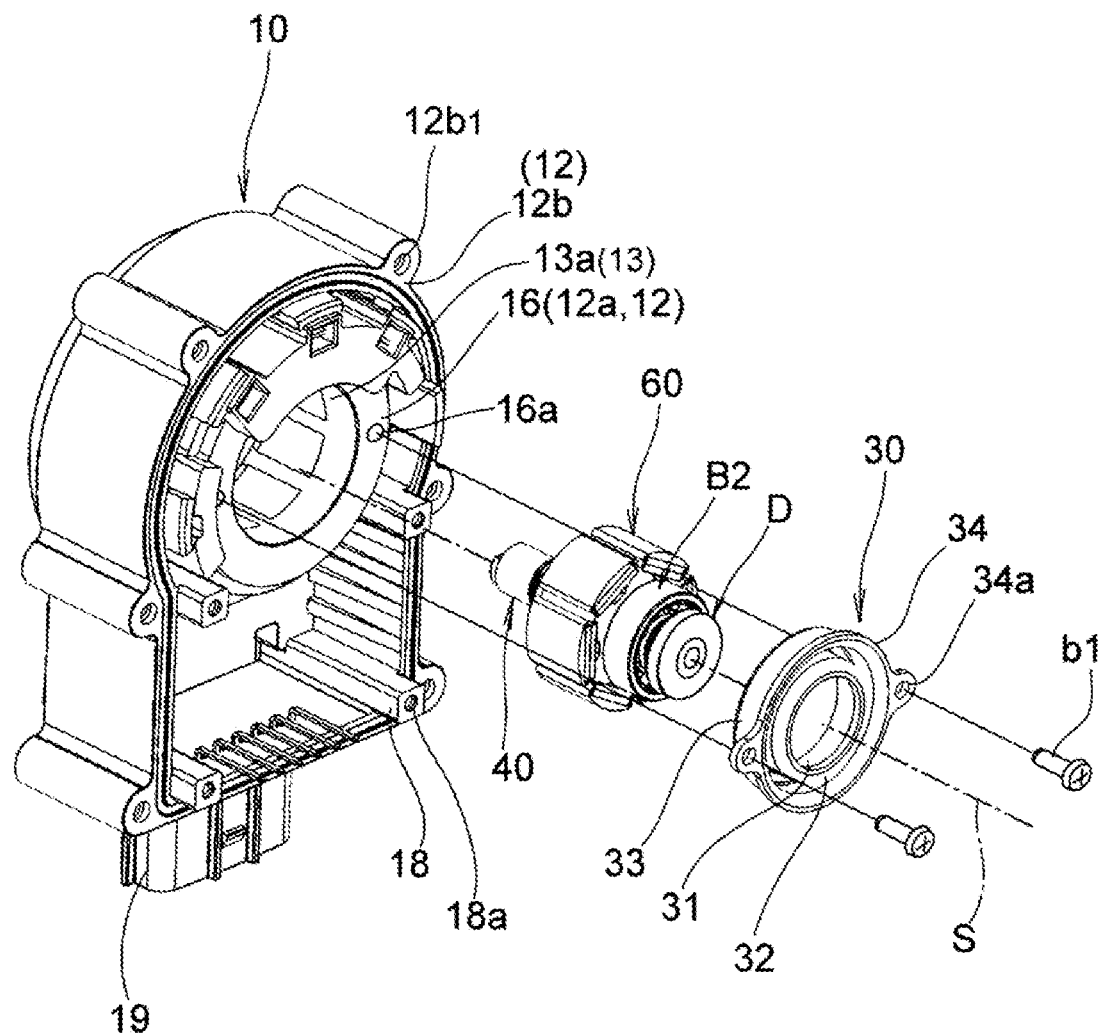
FIG. 7 is an exploded perspective view illustrating the body, the rotor, the rotation shaft, and the second bearing holder included in the rotation driving device according to the first embodiment and viewed from the other end side of the body.

The joining part 16, as shown in FIGS. 7, 10, and 12, is formed as a portion of the wall surface 12 on the other end side, is a region to which the second bearing holder 30 is joined in the direction of the axis S, and includes two screw holes 16a into which screws b1 are screwed. The embedding part 17, as shown in FIGS. 10 and 11, is formed in an a circular shape protruding from the wall surface 11 on the one end side toward the outer side in the direction of the axis S, and embeds the internal gear 70 so that internal teeth 71 are exposed. The embedding part 17 is a region entering the inner side of the first cover member 110, and the substantial width dimension of the body 10 is limited by the wall surface 11 on the one end side.

Figure 5:
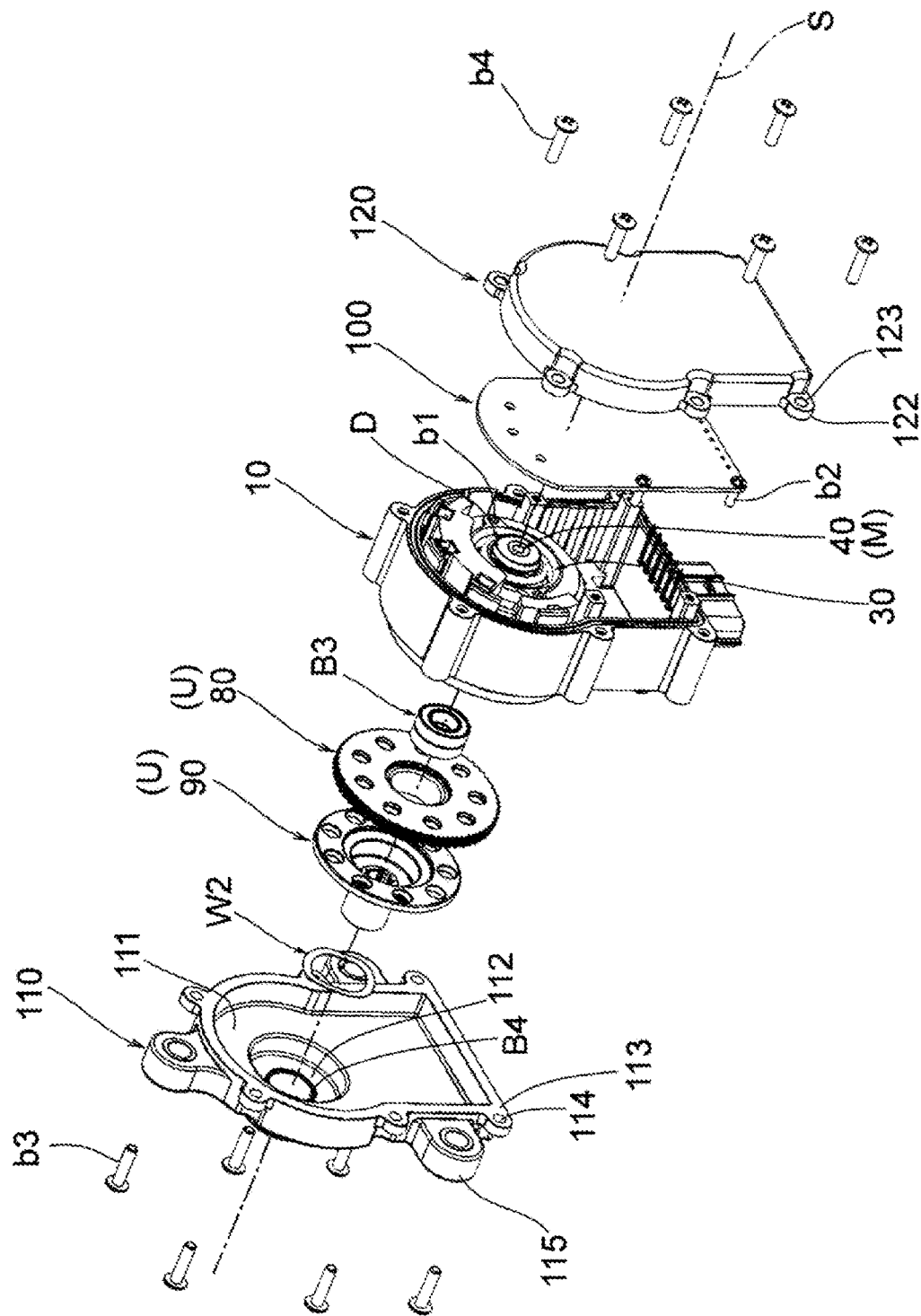
FIG. 5 is an exploded perspective view in which the rotation driving device according to the first embodiment is dissembled and viewed from the other end side of the body.

The mounting part 18, as shown in FIGS. 5 and 12, is formed as a column-like part protruding toward the outer side in the direction of the axis S from the wall surface 12 on the other end side, and includes a screw hole 18a into which the screw b2 is screwed on the end surface thereof. The mounting part 18 is a region entering the inner side of the second cover member 120, and the substantial width dimension of the body 10 is limited by the wall surface 12 on the other end side.

The connector 19 accommodates a terminal 19a connected to an external connector.

The first bearing holder 20, as shown in FIGS. 10 and 11 fits and fixes the first bearing B1 to the body 10, is formed by a metal material, and is embedded in the body 10 in a state in which an inner wall surface 20a is exposed.

The first bearing holder 20 includes a cylindrical part 21 with the axis S as the center and a ring-shaped part 22 continuous on the cylindrical part 21.

The cylindrical part 21 fits and fixes the first bearing B1.

The ring-shaped part 22 is formed in a vicinity of the end surface 11a of the body 10, and functions as a first limiting part limiting the movement of the first bearing B1 toward the outer side in the direction of the axis S.

The first bearing B1 rotatably supports the rotation shaft 40, and is a ball bearing including an internal ring to which the rotation shaft 40 is fit, an external ring to which the cylindrical part 21 is fit, and balls rolling between the internal ring and the external ring.

The second bearing holder 30, as shown in FIG. 10, fits and fixes the second bearing B2 to the body 10, is formed by a metal material, and is pressed into the inner circumferential surface 13a of the accommodation hole 13 and, as shown in FIG. 5, joined to the joining part 16 and fixed to the body 10 by the screws b1.

The second bearing holder 30 includes an inner cylindrical part 31 with the axis S as the center, a ring-shaped part 32 continuous on the inner cylindrical part 31, an outer cylindrical part 33 continuous on the inner cylindrical part 31 and with the axis S as the center, and a collar part 34 continuous on the outer cylindrical part 33.

The inner cylindrical part 31 fits and fixes the second bearing B2.

The ring-shaped part 32 is formed in a vicinity of the end surface 12a of the body 10, and functions as a second limiting part limiting the movement of the second bearing B2 toward the outer side in the direction of the axis S.

The outer cylindrical part 33 is pressed into the inner circumferential surface 13a of the accommodation hole 13 of the body 10 and fixed to the body 10.

The collar part 34 is joined to the joining part 16 of the body 10, and positions the second bearing holder 30 in the direction of the axis S.

The second bearing B2 rotatably supports the rotation shaft 40, and is a ball bearing including an internal ring to which the rotation shaft is fit, an external ring to which the cylindrical part 31 is fit, and balls rolling between the internal ring and the external ring.

Figure 3:
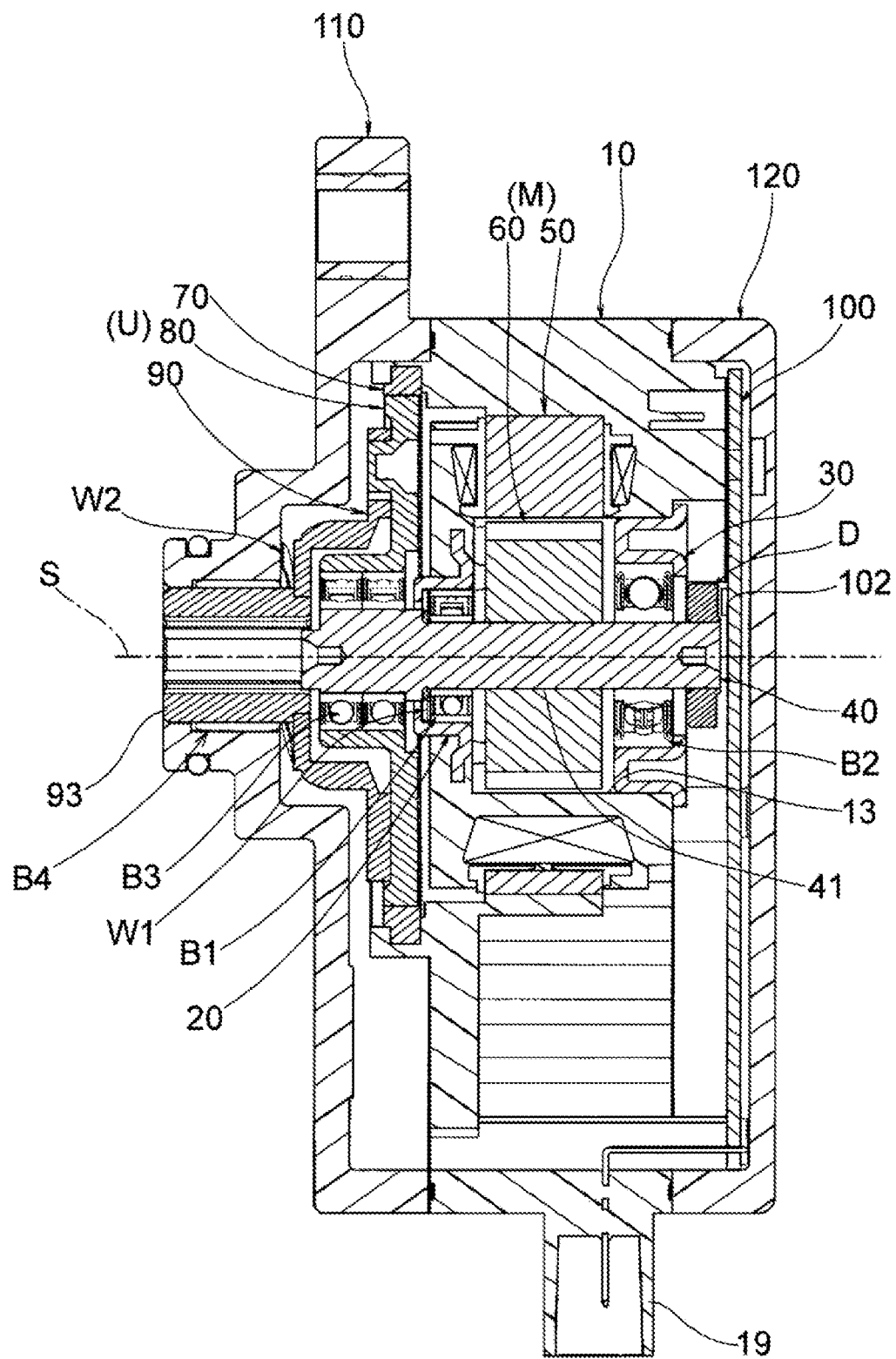
FIG. 3 is a cross-sectional view including an axis of the rotation driving device according to the first embodiment.
Figure 8:
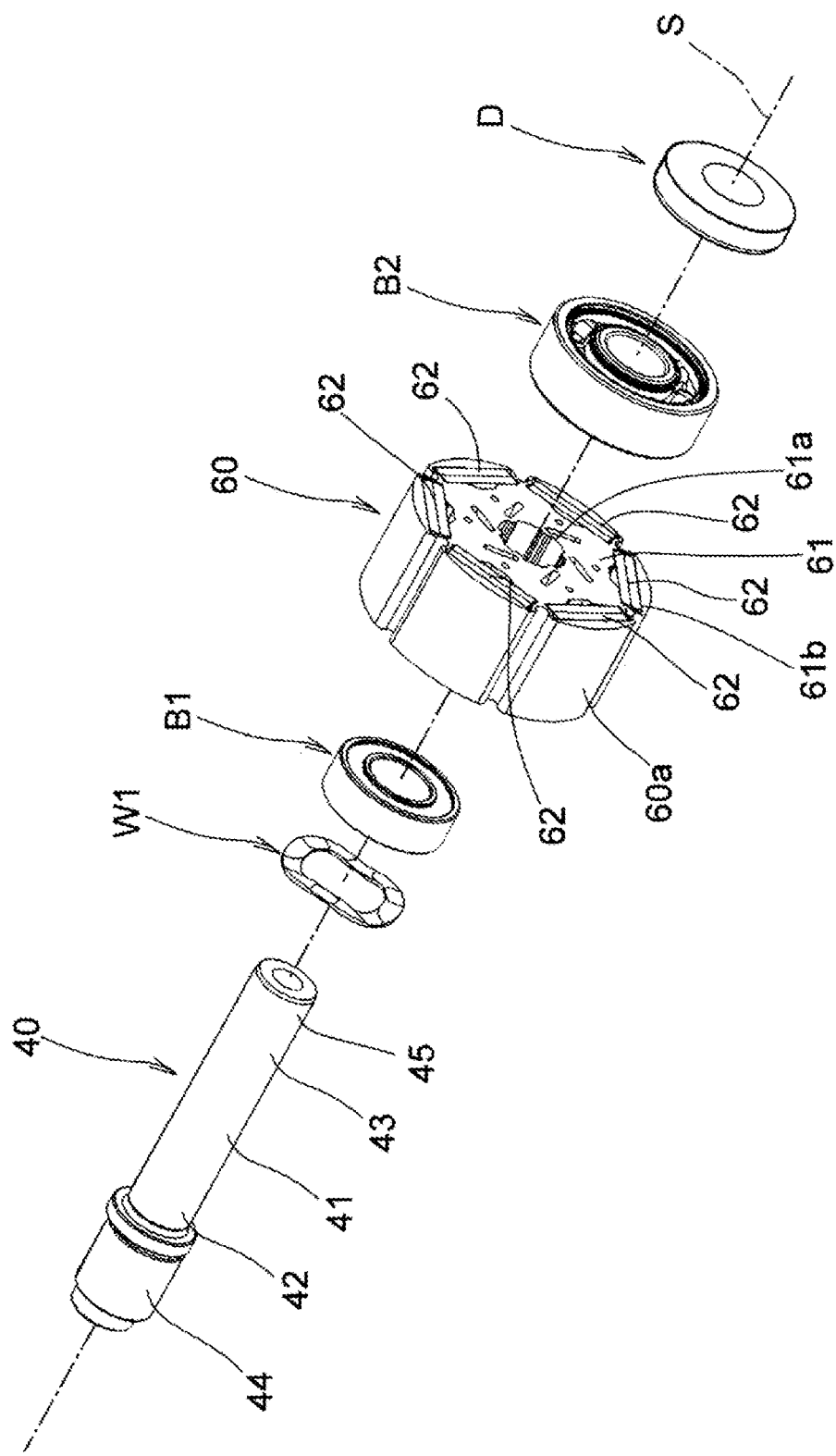
FIG. 8 is an exploded perspective view illustrating the rotation shaft, the rotor, a first bearing, a second bearing, and a detected part included in the rotation driving device according to the first embodiment.

The rotation shaft 40 is formed by a metal material, and serves as a physical shaft in a circular cross-section extending in the direction of the axis S and with the axis S as the center, and, as shown in FIGS. 3, 8, and 10, includes a shaft part 41, a shaft part 42, a shaft part 43, an eccentric shaft part 44, and a shaft part 45.

The shaft part 41 is a region fixed by fitting with the rotor 60.

The shaft part 42 is a region fixed by fitting with the internal ring of the first bearing B1.

The shaft part 43 is a region fixed by fitting with the internal ring of the second bearing B2.

The eccentric shaft part 44 is formed outside the shaft part 42 in the direction of the axis S, and serves as a connection part for connection with the deceleration unit U.

Here, the eccentric shaft part 44 is eccentric by a predetermined amount from the axis S in the radial direction and formed on a circular cross-section with an axis S2 as the center, the axis S2 being parallel to the axis S, and is connected with the external gear 80 of the deceleration unit U via a third bearing B3.

The shaft part 45 is a region outside the shaft part 43 fit with the second bearing B2 in the direction of the axis S, and is a region to which a detected part D is fit and fixed, the detected part being detected by a detection sensor 102 detecting the rotation position of the rotation shaft 40 and the rotor 60.

In addition, in the rotation shaft 40, in a state in which the rotor 60 is fixed to the shaft part 41, the external gear 80 is connected to the eccentric shaft part 44, and the detected part D is fixed to the shaft part 45, the shaft part 42 is rotatably supported with respect to the body 10 via the first bearing B1 and the first bearing holder 20 fixed to the one end side of the body 10, and the shaft part 43 is rotatably supported with respect to the body 10 via the second bearing B2 and the second bearing holder 30 fixed to the other end side of the body 10.

Accordingly, the rotation shaft 40 is supported to be rotatable around the axis S by the first bearing B1 fixed to the one end side and the second bearing B2 fixed to the other end side of one body 10. Therefore, compared with the case in which a shaft is supported by a bearing fixed to an end plate or a cover member of a member separate from the body in the conventional art, the rotation shaft 40 can be prevented from inclining.

Specifically, the first bearing holder 20 fit with the first bearing B1 is embedded in and fixed to the body 10, and the second bearing holder 30 fit with the second bearing B2 is pressed and fixed to the accommodation hole 13 of the body 10. Therefore, the axis alignment on the axis S can be performed with high accuracy.

As shown in FIGS. 9 and 10, the stator 50 includes a stator coil 51, the bobbin 52, and the coil 53.

The stator coil 51 is formed as a laminated body laminated after press-molding using a steel plate made of a magnetic material, and includes 9 pole teeth 51a protruding from the ring-shaped part toward the axis S.

The pole tooth 51a is formed on an arc surface defining a portion of the inner circumferential surface 13a of the accommodation hole 13, and is provided to face an outer circumferential surface 60a of the rotor 60.

The bobbin 52 is formed in a two-part structure by using a resin material with an electrical insulation property, and is assembled to sandwich the stator coil 51 in the direction of the axis S.

The coil 53 is respectively wound around the bobbin 52 surrounding the nine coil teeth 51a, and is connected to three terminals (not shown).

That is, the bobbin 52 is assembled to the stator core 51, and the coil 53 is wound around the bobbin 52, thereby forming the stator 50. Then, the stator 50 is embedded into the embedding part 14 of the body 10.

As shown in FIG. 8, the rotor 60 includes a rotor core 61 and six permanent magnets 62 fit to the rotor core 61.

The rotor core 61 is formed in a cylindrical shape by a laminated body laminated after press-molding using a steel plate made of a magnetic material, and includes a fitting hole 61a to which the rotation shaft 40 is fit and six insertion holes 61b into which the permanent magnets 62 are inserted.

The six permanent magnets 62 are formed in a substantially rectangular plate shape, and, as shown in FIG. 9, are respectively inserted into the insertion holes 61b of the rotor core 61 and provided so that N poles and S poles face each other, and are provided so that poles facing outward are alternately arranged at equal intervals in the circumferential direction around the axis S.

The motor M including the stator 50 and the rotor 60 with the above configuration is a three-phase brushless motor having nine slots and six magnetic poles.

The internal gear 70 is formed in a circular shape with the axis S as the center by using a metal material, as shown in FIGS. 6, 10, 11, and 13, and includes internal teeth 71 partially engaged with external teeth 81a of the external gear 80 on the inner circumferential surface.

Here, a tooth number $Z1n$ of the internal teeth 71 is set at n. In addition, the internal gear 70 is embedded in the embedding part 17 adjacent to the wall surface 11 of the body 10 on the one end side, so as to expose the internal teeth 71.

The external gear 80 is provided in adjacency with the end surface 11a of the body 10, as shown in FIGS. 3, 4, 13, and 14, and is partially engaged with the internal gear 70. The external gear 80 is formed in a disc-shaped by using a metal material, and includes a first disc part 81 and a first cylindrical part 82 integrally formed with the first disc part 81. The first disc part 81 includes the external teeth 81 engaged with the internal teeth 71 on the outer circumferential surface and nine protrusion parts 81b arranged in the circumferential direction. Here, a tooth number Z2 of the external teeth 81a is set at n−1. The protrusion part 81b functions as a first engagement part engaged with a second engagement part (insertion hole 91a) of the output rotation body 90.

Figure 14:
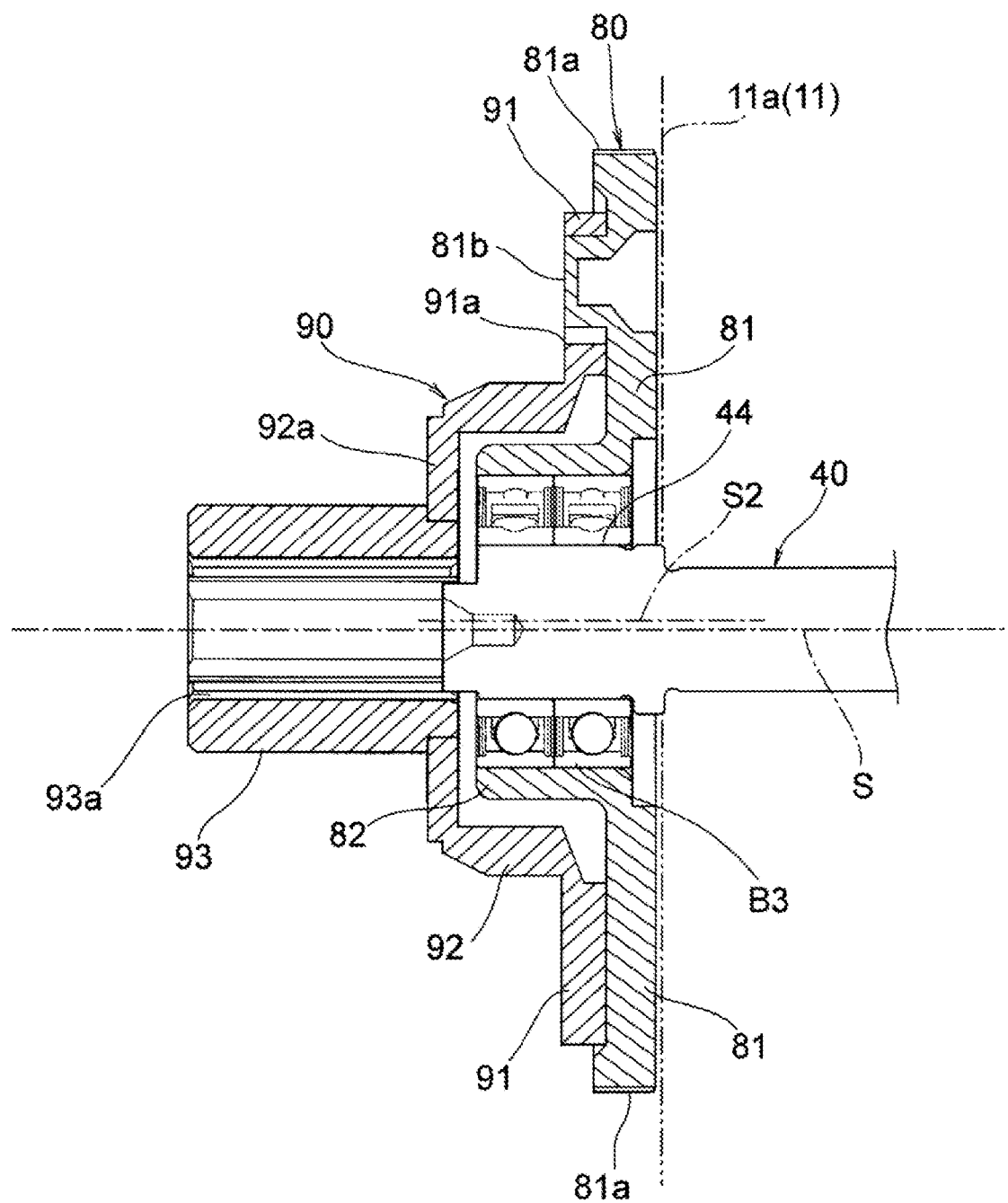
FIG. 14 is a cross-sectional view including the axis and illustrating a mutual relationship between the external gear and the output rotation body in the rotation driving device according to the first embodiment.

As shown in FIG. 14, the first cylindrical part 82 is formed in a cylindrical shape with the axis S2 of the eccentric shaft part 44 as the center, and is formed to protrude outward from the first disc part 81 in the direction of the axis S. The eccentric shaft part 44 of the rotation shaft 40 is connected to the inner side of the first cylindrical part 82 via the third bearing B3.

The third bearing B3 rotatably supports the external gear 80, and is a ball bearing including an internal ring to which the eccentric shaft part 44 is fit, an external ring to which the first cylindrical part 82 of the external gear 80 is fit, and balls rolling between the internal ring and the external ring.

Figure 13:
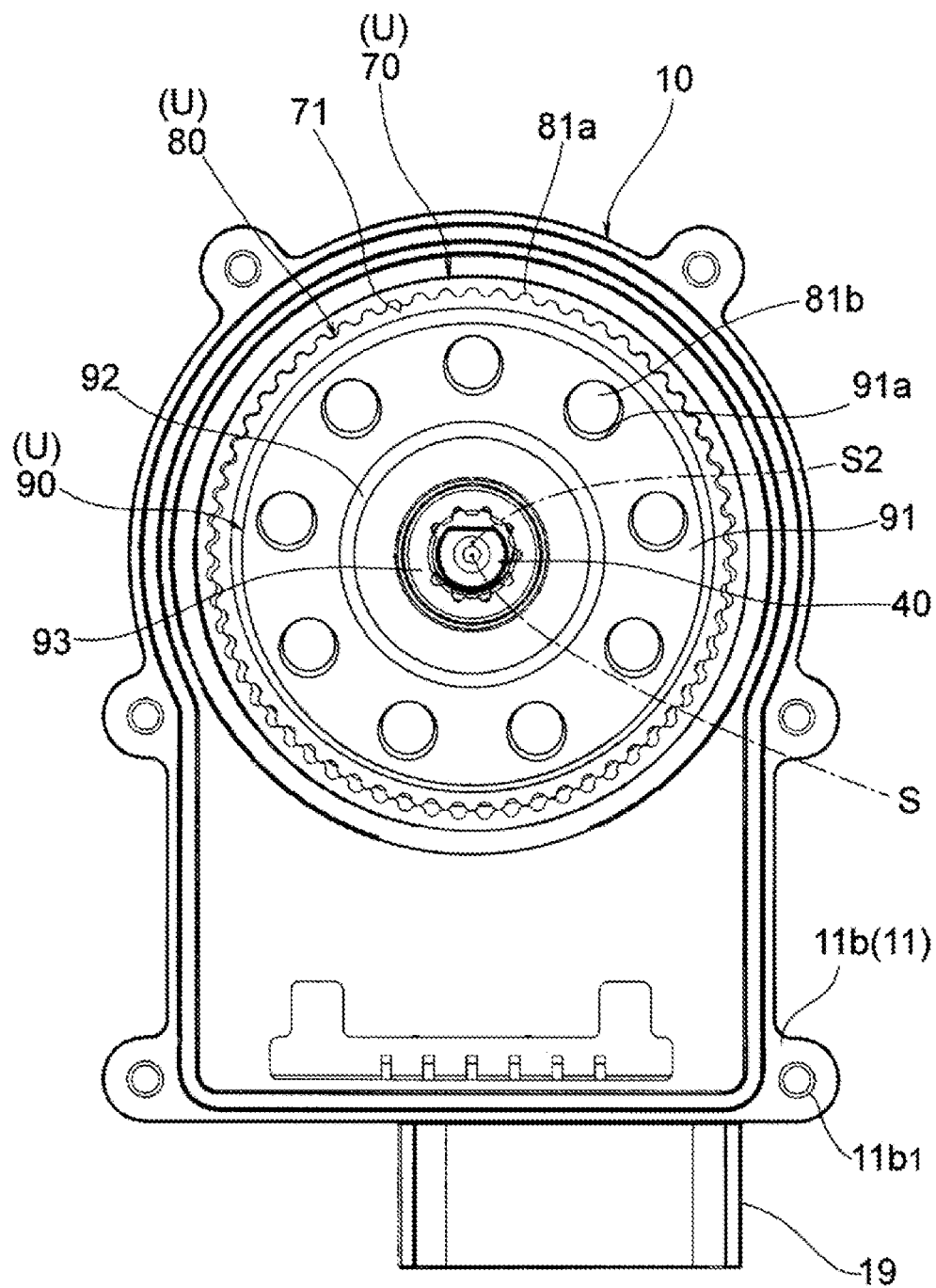
FIG. 13 is a cross-sectional view illustrating a deceleration unit (the internal gear, an external gear, an output rotation body) in the rotation driving device according to the first embodiment when viewed from the one end side of the body with a first cover member being removed.

That is, in the external gear 80, the first cylindrical part 82 is rotatably supported by the eccentric shaft part 44 via the third bearing B3, the first disc part 81 is provided in adjacency with the wall surface 11 (end surface 11a) of the body 10 on the one end side, and, as shown in FIG. 13, the external teeth 81a are partially engaged with the internal teeth 71 of the internal gear 70.

Accordingly, with the rotation of the rotation shaft 40, the external gear 80 changes the engagement position with the internal gear 70 while rotating around the axis S2 and revolving around the axis S.

As shown in FIGS. 3, 4, 13, and 14, the output rotation body 90 is formed in a substantially disc shape by using a metal material, and includes a second disc part 91, a second cylindrical part 92 integrally formed with the second disc part 91, and an output part 93 combined with the second cylindrical part 92.

The second disc part 91 includes nine insertion holes 91a arranged in the circumferential direction. The insertion hole 91a functions as the second engagement part engaged with the first engagement part (protrusion part 81*b*) of the external gear 80. In addition, the insertion hole 91*a* allows the external gear 80 to rotate and revolve while receiving the protrusion part 81*b* to be interlocked with the external gear 80.

As shown in FIG. 14, the second cylindrical part 92 is formed in a bottomed cylindrical shape having an outer diameter greater than the first cylindrical part 82 of the external gear 80 and using the axis S as the center, that is, the second cylindrical part 92 is formed to surround the periphery of the first cylindrical part 82. In addition, the second cylindrical part 92 includes a bottom wall part 92*a* defining a combination hole with which the output part 93 is combined. In addition, the second washer W2 is adjacently provided on the bottom wall part 92*a*.

As shown in FIG. 14, the output part 93 is formed in a cylindrical shape with the axis S as the center, and includes, on the inner side, a connection hole 93*a* connected with an external suitable target object. In addition, the output part 93 is fit and fixed to the combination hole of the bottom wall part 92*a* of the second cylindrical part 92 in the direction of the axis S.

Accordingly, the output part 93 forms a part of the output rotation body 90, and is a bound article separate from the first disc part 81 and the second cylindrical part 92. Therefore, by setting the shape of the output part 93 in various ways, a suitable connection shape can be changed as needed.

In the output rotation body 90, the output part 93 is fit with a bush B4 provided in the first cover member 110, and is supported to be rotatable around the axis S.

That is, the output rotation body 90 is provided so that the output rotation body 90 is supported to be rotatable around the axis S with respect to the first cover member 110, the protrusion part 81*b* of the external gear 80 is movably inserted into the insertion hole 91*a*, the second disc part 91 is adjacent to the first disc part 81 of the external gear 80, and the second cylindrical part 92 surrounds the periphery of the first cylindrical part 82 of the external gear 80.

The deceleration unit with the above configuration forms a cycloid deceleration mechanism and has a deceleration ratio of:Z2/(Z1−Z2)=n. Here, the tooth number Z1 of the internal gear 70 is 61 and the tooth number Z2 of the external gear 80 is 60. Therefore, the rotation speed of the rotation shaft 40 is decelerated to 1/60 and output from the output part 93 to the outside.

Figure 4:
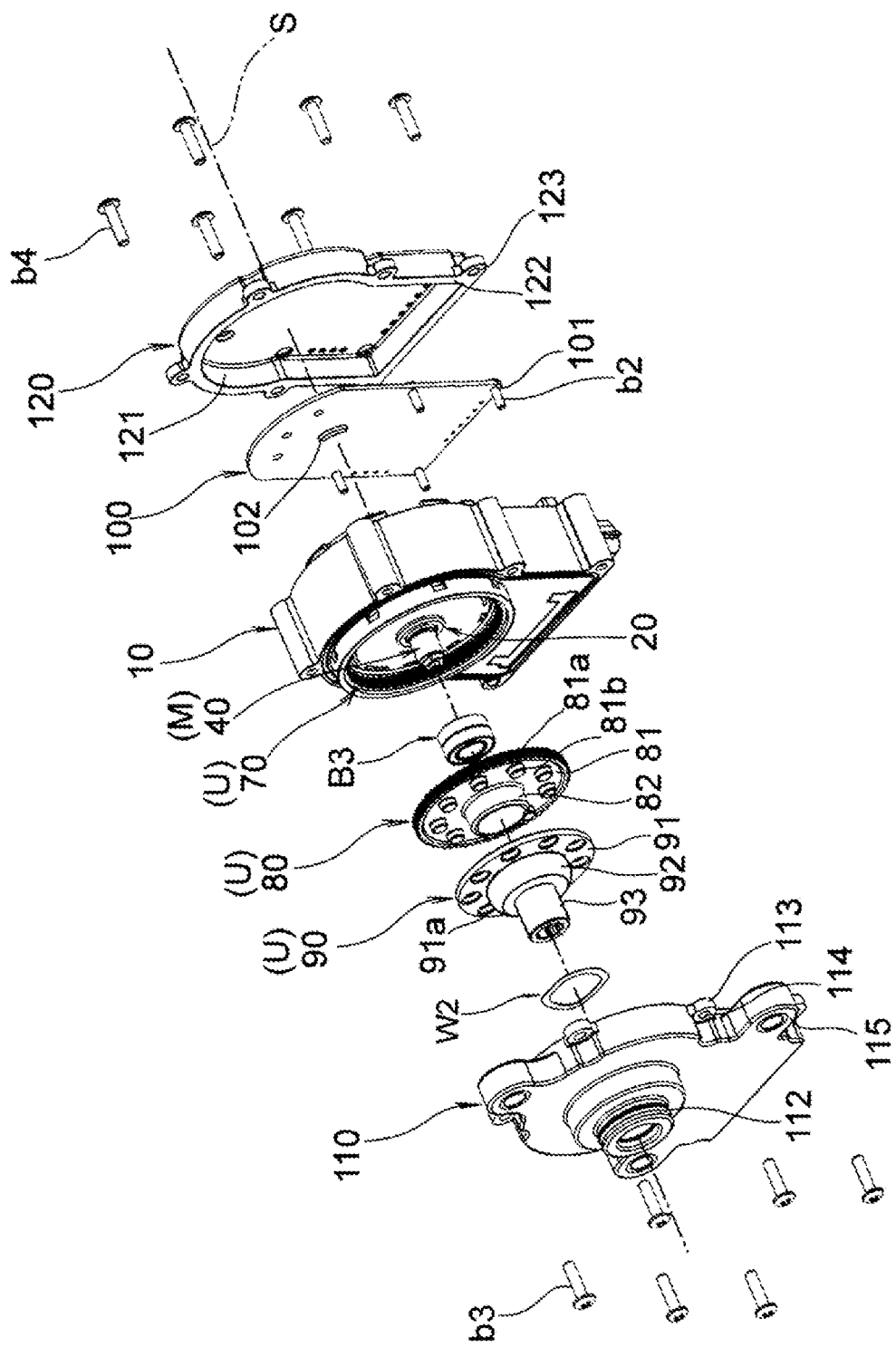
FIG. 4 is an exploded perspective view in which the rotation driving device according to the first embodiment is dissembled and viewed from one end side of a body.

As shown in FIGS. 3 to 5, the circuit substrate 100 is formed in a substantially rectangular plate shape and includes four circular holes 101 through which the screws b2 pass. Wirings are printed on the circuit substrate 100, and on the inner surface opposite to the body 10, a control circuit controlling the drive of the motor M as well as various electronic components (not shown) are mounted, and a detection sensor 102 is mounted on the inner surface opposite to the body 10.

The detection sensor 102 detects the rotation position of the rotation shaft 40 and the rotor 60, and includes three Hall elements arranged in an arc shape with the axis S as the center to face the detected part D in the direction of the axis S.

The first cover member 110 covers the one end side of the body 10 and is formed by using a resin material. As shown in FIGS. 1 to 5, the first cover member 110 includes a concave accommodation part 111, a cylindrical part 112, a flange part 113 joined to the first joining surface 11*b* of the body 10, six circular holes 114 which are formed in the flange part 113 and through which the screws b3 pass through, and three mounting parts 115 which can be mounted to a suitable target object.

The outer circumferential wall of the embedding part 17 of the body 10 is fit to the inner circumferential wall of the accommodation part 111, and the accommodation part 111 accommodates the deceleration unit U and the embedding part 17 of the body 10.

The cylindrical part 112 is formed as a cylindrical hole with the axis S as the center to support the output rotation body 90 of the deceleration unit U to be rotatable around the axis S, and the cylindrical bush B4 is fit to the inner side thereof.

In a state in which the deceleration unit U is provided in adjacency with the wall surface 11 of the body 10 on the one end side, in the first cover member 110, the output part 93 of the output rotation body 90 is rotatably fit to the cylindrical part 112, and the flange part 113 is joined to the first joining surface 11*b* of the body 10 to be connected to the body 10 by the screws b3.

The second cover member 120 covers the other end side of the body 10 and is formed by using a resin material. As shown in FIGS. 1 to 5, the second cover member 120 includes an accommodation part 121 accommodating the circuit substrate 100 and the mounting part 18 of the body 10, a flange part 122 joined to the second joining surface 12*b* of the body 10, and six circular holes 123 which are formed in the flange part 122 and through which the screws b4 pass through.

In addition, in a state in which the circuit substrate 100 is provided in adjacency with the wall surface 12 of the body 10 on the other end side, in the second cover member 120, the flange part 122 is joined to the second joining surface 12*b* of the body 10 to be connected to the body 10 by the screws b4.

Figure 6:
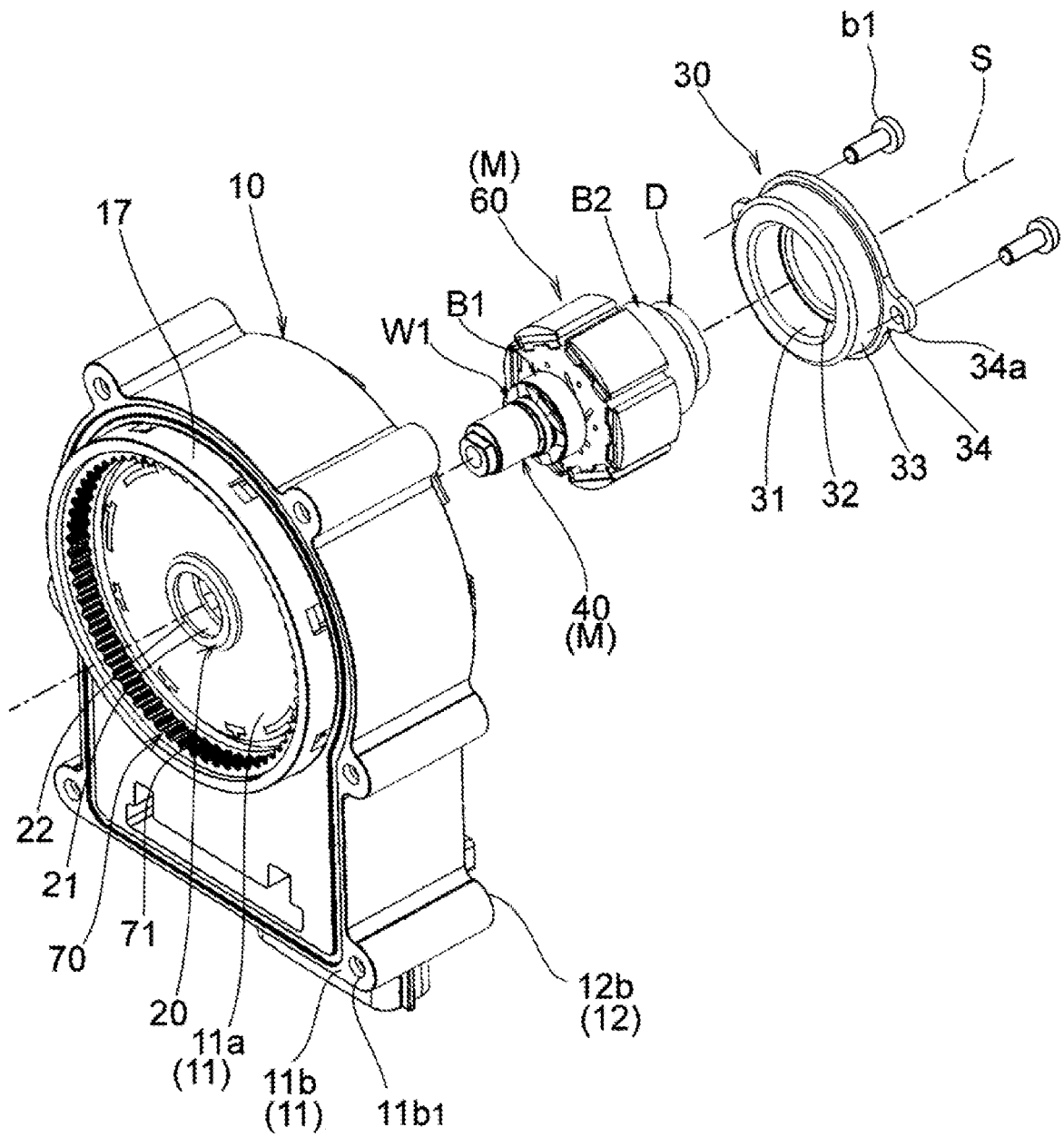
FIG. 6 is an exploded perspective view illustrating the body, a rotor, the rotation shaft, and a second bearing holder included in the rotation driving device according to the first embodiment and viewed from the one end side of the body.

As shown in FIGS. 6, 8, 10, the first washer W1 is a wave washer formed by spring steel, and is provided in adjacency with the first bearing B1. Specifically, the first washer W1 is provided in adjacency with the ring-shaped part 22 of the first bearing holder 20 and the first bearing B1 and applies an urging force to the rotation shaft 40 in the direction of the axis S.

That is, the first washer W1 applies a resisting force when the rotation shaft 40 is about to move in the direction of the axis S.

Accordingly, by providing the first washer W1, the impact received on the rotation shaft 40 in the direction of the axis S can be alleviated.

As shown in FIGS. 3, 4, and 5, the second washer W2 is a wave washer formed by spring steel, and is provided in adjacency with the output rotation body 90 forming the deceleration unit U. Specifically, the second washer W2 is provided to be interposed between the bottom wall part 92*a* of the second cylindrical part 92 of the output rotation body 90 and the inner wall of the cylindrical part 112 of the first cover member 110, and applies an urging force to the output rotation body 90 in the direction of the axis S. That is, the second washer W2 presses the output rotation body 90 against the external gear 80, and, when the rotation shaft 40 is about to move in the direction of the axis S, applies a resisting force via the external gear 80 and the third bearing B3.

Accordingly, by providing the second washer W2, the impact received on the rotation shaft 40 in the direction of the axis S can be alleviated.

Here, by providing the second washer W2 in addition to the first washer W1, when the impact applied by the suitable target object is transmitted to the rotation driving device via the output part 93, the first washer W1 and the second washer W2 provide alleviation to absorb the impact.

Accordingly, with the impact alleviation of the first washer W1 and the second washer W2, the rotation driving device can be prevented from being damaged, and the anticipated function can be guaranteed.

Regarding the operation of the rotation driving device according to the first embodiment, the motor M is suitably drive-controlled by the control circuit provided in the circuit substrate 100.

In addition, when the rotor 60 and the rotation shaft 40 rotate around the axis S, through the eccentric shaft part 44, the external gear 80 rotates around the axis S2 and revolves around the axis S.

Accordingly, the external gear 80 is decelerated with respect to the rotation speed of the rotation shaft 40 at the deceleration ratio=n and rotates.

When the external gear 80 rotates, through the engagement between the protrusion parts 81b and the insertion holes 91a, the output rotation body 90 is interlocked with the external gear 80 to rotate around the axis S.

Therefore, with the output part 93 of the output rotation body 90 being interlocked with the driving target object, the decelerated rotation force is output to the outside.

According to the rotation driving device according to the first embodiment, the rotation shaft 40 is supported to be rotatable around the axis S by the first bearing B1 fixed to the one end side and the second bearing B2 fixed to the other end side of one body 10. Therefore, compared with the case in which a shaft is supported by an end plate or a cover member of a member separate from the body in the conventional art, the rotation shaft 40 can be prevented from inclining.

In addition, the internal gear 70 is provided in adjacency with the wall surface 11 of the body 10 on the one end side in the direction of the axis S, the first disc part 81 of the external gear 80 is provided in adjacency with the wall surface (end surface 11a) of the body 10 on the one end side in the direction of the axis S, the second disc part 91 of the output rotation body 90 is provided in adjacency with the first disc part 81 of the external gear 80 in the direction of the axis S, and the second cylindrical part 92 of the output rotation body 90 is provided to surround the periphery of the first cylindrical part 82 of the external gear 80.

Figure 2:
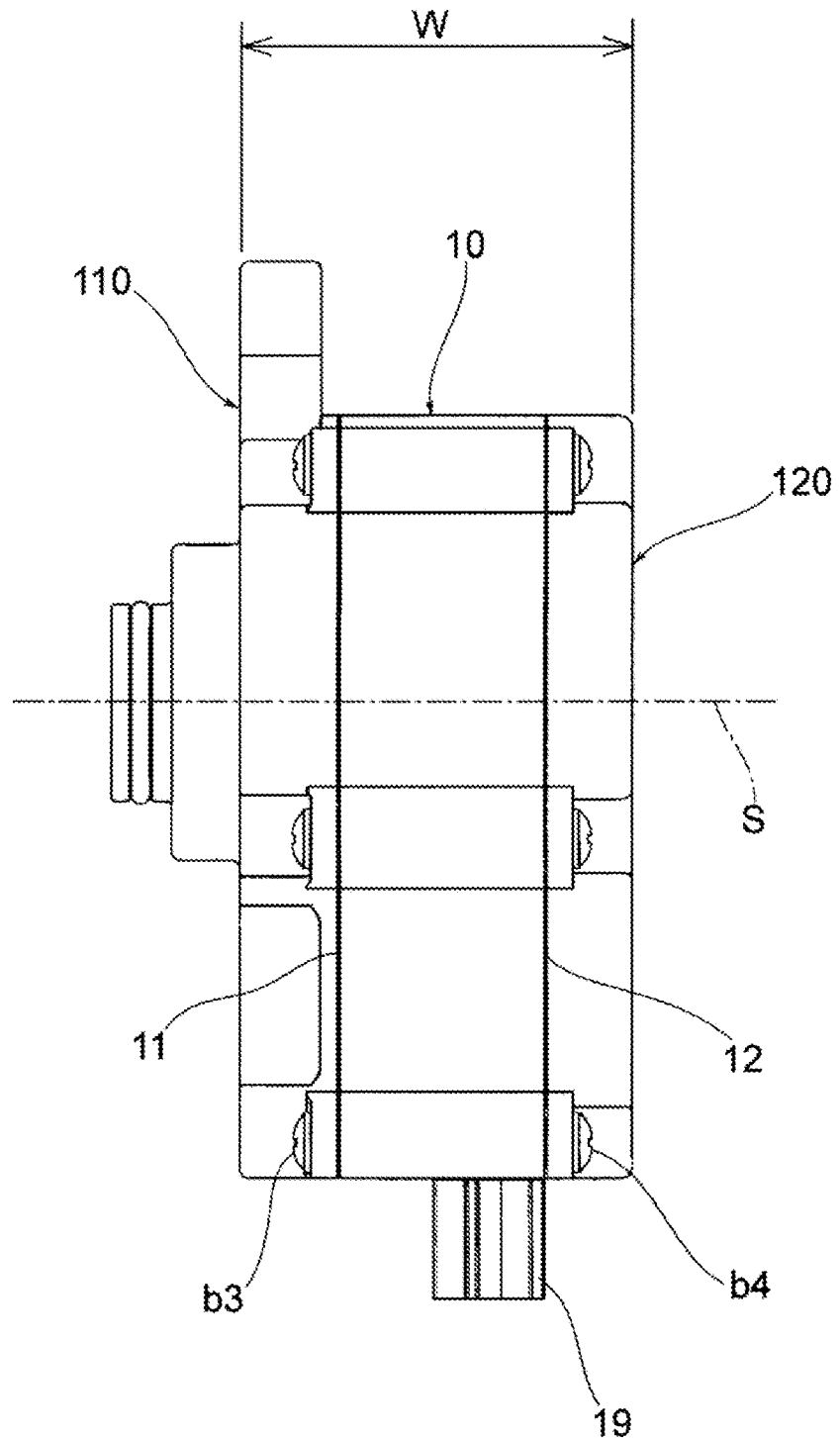
FIG. 2 is a side view of the rotation driving device according to the first embodiment.

Therefore, the deceleration unit U can be provided in a more integrated manner in the direction of the axis S, and, as shown in FIG. 2, the width dimension W of the device in the direction of the axis S can be reduced. Accordingly, the thickness and the volume of the device can be reduced.

In the following, an operation of assembling the rotation driving device according to the first embodiment will be described.

First of all, the body 10 in which the first bearing holder 20, the stator 50, the internal gear 70, the terminal 19a, and other connection wirings (not shown) are integrally embedded, the second bearing holder 30, the rotation shaft 40, the rotor 60, the detected part D, the first bearing B1, the second bearing B2, the third bearing B3, the first washer W1, the second washer W2, the circuit substrate 100, the first cover member 10 to which the bush B4 is fixed, and the second cover member 120 are prepared.

Then, with respect to the rotation shaft 40, the first washer W1, the first bearing B1, the rotor 60, the second bearing B2, and the detected part D are mounted in the order shown in FIG. 8.

Then, as shown in FIGS. 6 and 7, the rotation shaft 40 approaches the accommodation hole 13 of the body 10 from the other end side of the body 10, and the first bearing B1 is fit and fixed to the first bearing holder 20.

In addition, the second bearing holder 30 is pressed into the accommodating hole 13 of the body 10 and fit with the second bearing B2, and the collar part 34 is joined to the joining part 16 of the body 10. Then, the screws b1 are screwed into the screw holes 16a through the circular holes 34a.

Accordingly, the rotation shaft 40 is supported to be rotatable around the axis S via the first bearing B1 and the second bearing B2 with respect to the body 10 without having inclination on the axis S.

In addition, the third bearing B3 is fit to the eccentric shaft part 44 of the rotation shaft 40.

In addition, the external gear 80 approaches from the one end side of the body 10 and the third bearing B3 is fit to the inner side of the first cylindrical part 82, and the external teeth 81a are provided in adjacency with the end surface 11a of the one end side of the body 10, so as to be partially engaged with the internal teeth 71 of the internal gear 70.

Then, the output rotation body 90 approaches from the outer side of the external gear 80, and is provided so that the second cylindrical part 92 surrounds the periphery of the first cylindrical part 82 of the external gear 80 and so that the second disc part 91 is adjacent to the first disc part 81 of the external gear 80, and the protrusion parts 81b are movably inserted into the insertion holes 91a. In addition, the second washer W2 is provided to abut against the end surface of the second cylindrical part 92.

In addition, the first cover member 110 approaches from the outer side of the output rotation body 90, the output part 93 is rotatably fit into the cylindrical part 112, and the flange part 113 is joined to the first joining surface 11b of the body 10. Then, the screws b3 are screwed into the screw holes 11b1 of the body 10 through the circular holes 114. Accordingly, the first cover member 110 is connected to the body 10 to cover the deceleration unit U.

Then, the circuit substrate 100 approaches the other end side of the body 10 and is held by abutting against the mounting part 18, and the screws b2 are screwed into the screw holes 18a through the circular holes 101. Accordingly, the circuit substrate 100 is fixed to the body 10, and the detection sensor 102 is provided to face the detected part D in the direction of the axis S.

Then, the second cover member 120 approaches the body 10 from the outer side of the circuit substrate 100, and the flange part 122 is joined to the second joining surface 12b of the body 10. Then, the screws b4 are screwed into the screw holes 12b1 of the body 10 through the circular holes 123. Accordingly, the second cover member 120 is connected to the body 10 to cover the circuit substrate 10.

Accordingly, the assembling of the rotation driving device is completed. It should be noted that the assembling process is not limited to the above order, and other processes may also be adopted.

As described above, the rotation driving device with the above configuration is capable of preventing the rotation shaft 40 of the motor M from inclining while reducing the thickness and the volume of the device in the direction of the axis S of the rotation shaft 40.

Figure 15:
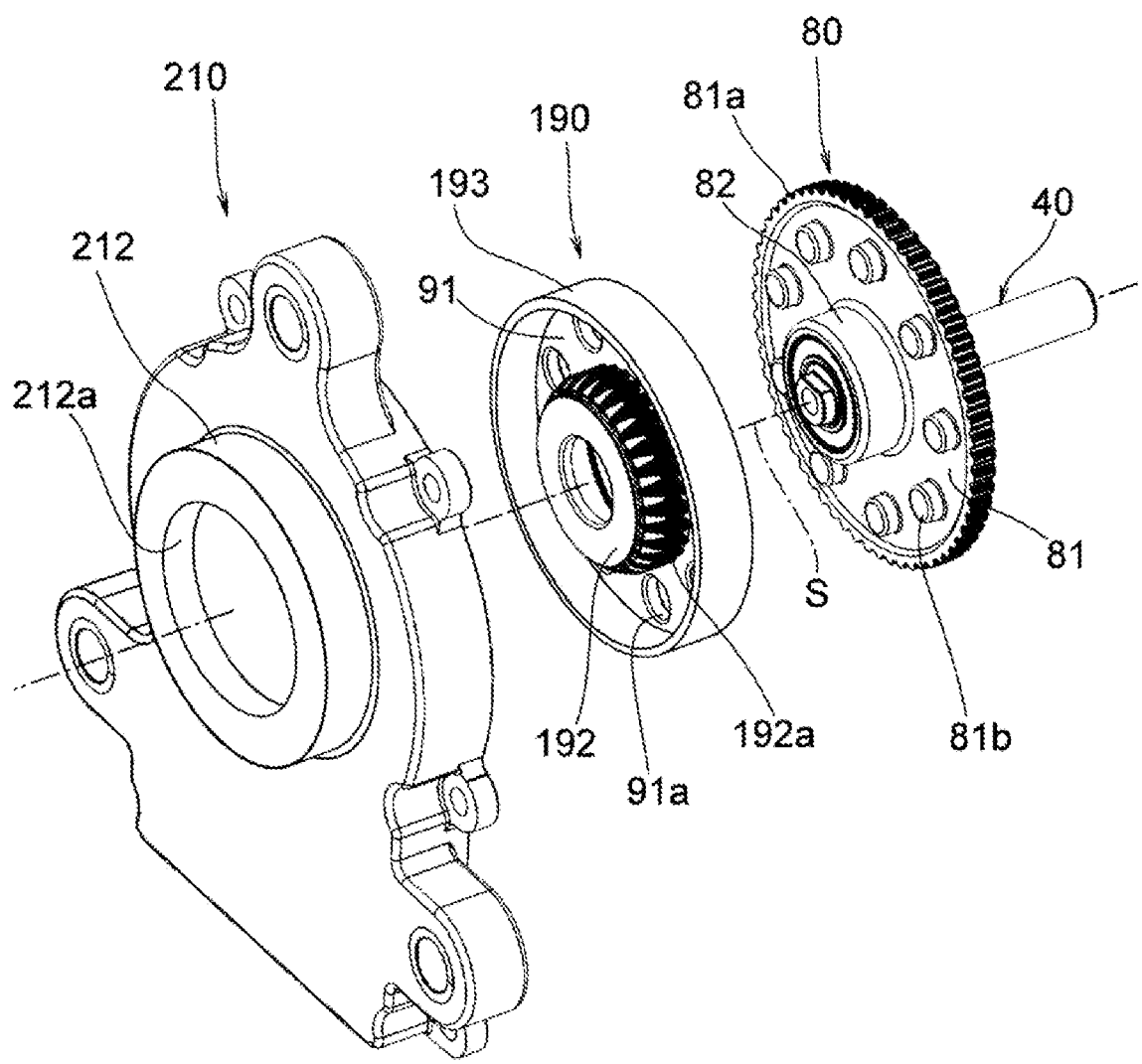
FIG. 15 is an exploded perspective view illustrating a rotation driving device according to a second embodiment of the invention, and illustrating a first cover member, an output rotation body, an external gear, and a rotation shaft.
Figure 16:
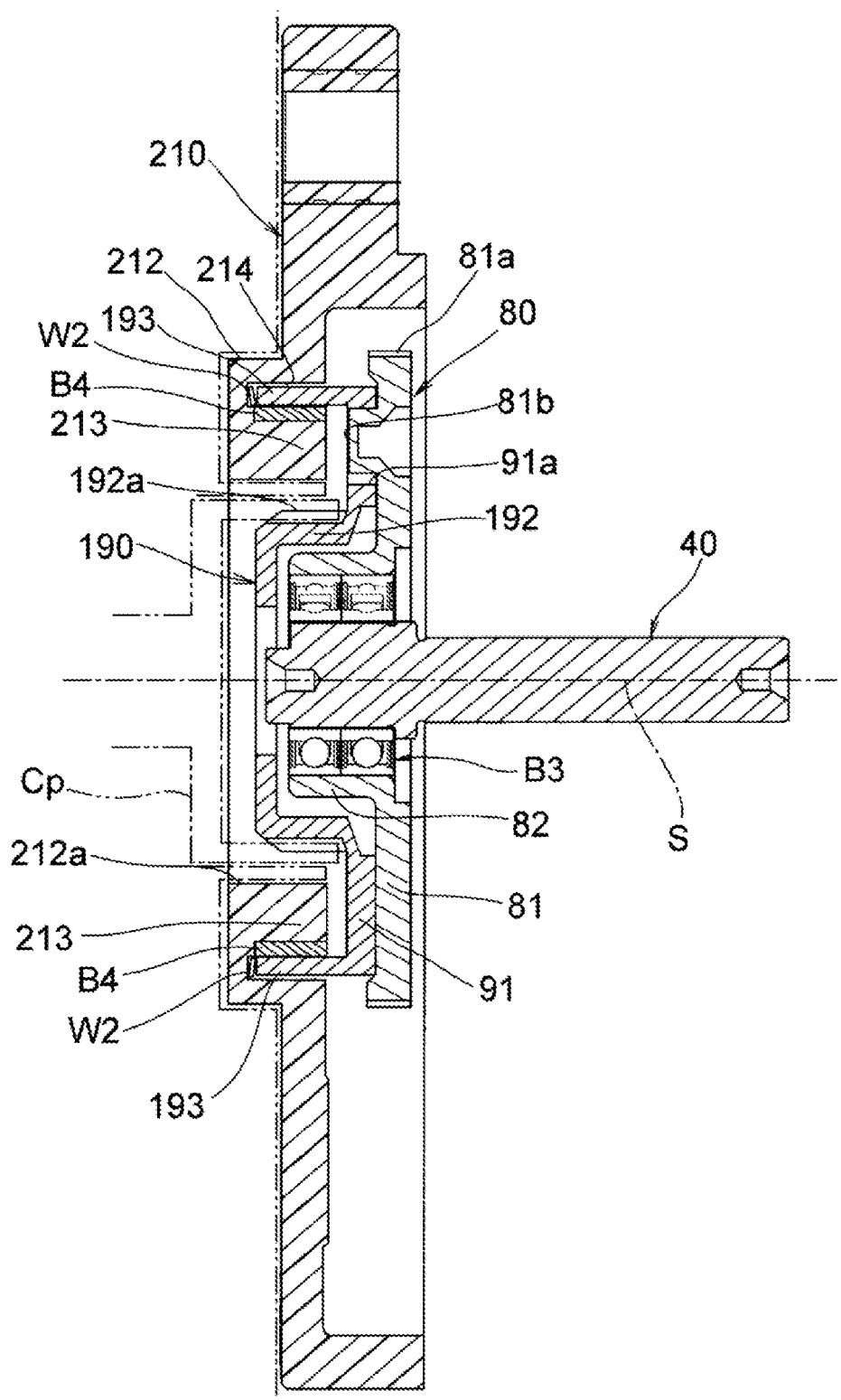
FIG. 16 is a cross-sectional view illustrating an assembling state of the external gear and the rotation shaft, the output rotation body, and the first cover member in the rotation driving device according to the second embodiment.

FIGS. 15 and 16 illustrates a rotation driving device according to a second embodiment of the invention, which is the same as the first embodiment except that the output rotation body of the deceleration unit U and the first cover member included in the rotation driving device are changed.

In the second embodiment, a configuration same as that of the first embodiment is labeled with the same reference symbol, and the description thereof is omitted.

The rotation driving device according to the second embodiment includes the body 10, the first bearing holder 20, the second bearing holder 30, the rotation shaft 40, the stator 50, the rotor 60, the internal gear 70, the external gear 80, an output rotation body 190, the circuit substrate 100, a first cover member 210, and the second cover member 120.

The output rotation body 190 is formed in a bottomed double cylindrical shape by using a metal material, and includes the second disc part 91, a second cylindrical part 192 integrally formed with the second disc part 91, and an outer cylindrical part 193 integrally formed with the second disc part 91.

As shown in FIG. 16, the second cylindrical part 192 is formed in a cylindrical shape having an outer diameter greater than the first cylindrical part 82 of the external gear 80 and using the axis S as the center, that is, the second cylindrical part 192 is formed to surround the periphery of the first cylindrical part 82.

In addition, external teeth 192a, as an output part, are formed on the outer circumference of the second cylindrical part 192. In addition, the external teeth 192a are formed to be connected with a connection body having internal teeth of an external suitable target object.

The outer cylindrical part 193 is formed to be supported to be rotatable around the axis S by a support part 213 of the first cover member 210 via the bush B4. In addition, the outer cylindrical part 193 is urged toward the external gear 80 via the second washer W2 in the direction of the axis S.

In addition, in the output rotation body 190, the external cylindrical part 193 is fit with a support part 312 provided in the first cover member 210 via the bush B4, and is supported to be rotatable around the axis S.

That is, the output rotation body 190 is provided so that the output rotation body 90 is supported to be rotatable around the axis S with respect to the first cover member 210, the protrusion part 81b of the external gear 80 is movably inserted into the insertion hole 91a, the second disc part 91 is adjacent to the first disc part 81 of the external gear 80, and the second cylindrical part 192 surrounds the periphery of the first cylindrical part 82 of the external gear 80.

The first cover member 210 covers the one end side of the body 10, is formed in a resin material, and includes the accommodation part 111, a cylindrical part 212, the flange part 113, six circular holes 114, three mounting parts 115, the support part 213, and the ring-shaped concave part 214.

The cylindrical part 212 defines an opening part 212a into which a connection part Cp of an external suitable target object is inserted.

The support part 213 is formed in a cylindrical shape with the axis S as the center on the inner wall surface defining the accommodation part 111, and the bush B4 is fit and fixed to the outer circumferential surface thereof.

A ring-shaped recess part 214 is formed in a dimension with which the outer cylindrical part 193 of the output rotation body 190 can be inserted, and is formed so to accommodate the second washer W2 on the bottom surface thereof.

In a state in which the deceleration unit U is provided in adjacency with the wall surface 11 of the body 10 on the one end side, in the first cover member 210, the outer cylindrical part 193 of the output rotation body 190 is rotatably fit to the support part 213, and the flange part 113 is joined to the first joining surface 11b of the body 10 to be connected to the body 10 by the screws b3.

According to the rotation driving device according to the second embodiment, the internal gear 70 is provided in adjacency with the wall surface 11 of the body 10 on the one end side in the direction of the axis S, the first disc part 81 of the external gear 80 is provided in adjacency with the wall surface (end surface 11a) of the body 10 on the one end side in the direction of the axis S, the second disc part 91 of the output rotation body 190 is provided in adjacency with the first disc part 81 of the external gear 80 in the direction of the axis S, and the second cylindrical part 192 of the output rotation body 190 is provided to surround the periphery of the first cylindrical part 82 of the external gear 80.

In particular, by providing the external teeth 192a as the output part on the outer circumference of the second cylindrical part 192 of the output rotation body 190, compared with the output rotation body 90 of the first embodiment, the portion protruding outward in the direction of the axis S can be reduced. Therefore, the deceleration unit U can be provided in a more integrated manner in the direction of the axis S, and the thickness and the volume of the device in the direction of the axis S can be reduced.

Moreover, in the second embodiment, like the first embodiment, by providing the first washer W1 and the second washer W2, when the impact applied by the suitable target object is transmitted to the rotation driving device via the external teeth 192a, the first washer W1 and the second washer W2 provide alleviation to absorb the impact.

Accordingly, with the impact alleviation of the first washer W1 and the second washer W2, the rotation driving device can be prevented from being damaged, and the anticipated function can be guaranteed.

As described above, the rotation driving device with the above configuration is capable of preventing the rotation shaft 40 of the motor M from inclining while reducing the thickness and the volume of the device in the direction of the axis S of the rotation shaft 40.

In the above embodiment, although a configuration in which the first bearing B1 and the second bearing B2 are fixed to the body 10 via the first bearing holder 20 and the second bearing holder 30 is shown, the invention is not limited thereto. The first bearing B1 and the second bearing B2 may also be directly fit and fixed to the accommodation hole 13 of the body 10, as long as the body 10 is firmly formed.

Although the rotation driving device including the deceleration unit U decelerating the speed of the rotation shaft 40 is shown in the above embodiment, the invention is not limited thereto. A configuration in which the deceleration unit U is omitted may also be adopted.

In the above embodiment, in the external gear 80 and the output rotation body 90/190 forming the deceleration unit U, the protrusion parts 81b of the external gear 80 are shown as the first engagement part, and the insertion holes 91a of the output rotation body 90/190 are shown as the second engagement part. However, the invention is not limited thereto, and other configurations may also be adopted.

In the above embodiment, a cycloid deceleration mechanism including the internal gear 70, the external gear 80, and the output rotation body 90/190 is shown as the deceleration unit U. However, the invention is not limited thereto. Other deceleration mechanisms may also be adopted as the deceleration unit.

For example, if a planetary gear mechanism is adopted as the deceleration unit, the connection part of the rotation shaft is formed as a rotation shaft with the axis S as the center, and is connected to a sun gear of the planetary gear mechanism. Also, if a wave gear mechanism is adopted as the deceleration unit, the connection part of the rotation shaft is formed as a rotation shaft with the axis S as the center and connected to a wave generator that generates a wave.

As described above, the rotation driving device according to the invention is capable of preventing the rotation shaft of the motor from inclining as well as reducing the thickness and the volume of the device. Therefore, not only can the rotation driving device be applied as the rotation driving device of various apparatuses, but the rotation driving device is useful as a rotation driving device which decelerates the rotation of the motor and transmits the decelerated rotation to the outside, such as a rotation driving device of a machine mounted in a vehicle.

What is claimed is:

1. A rotation driving device, comprising:
   a body, made of resin, and having an accommodation hole in a cylindrical shape with an axis as a center;
   a motor, comprising a rotor provided in the accommodation hole of the body and rotating around the axis and a rotation shaft integrally rotating around the axis with the rotor and extending in an axial direction;
   a first bearing fixed to one end side of the body and a second bearing fixed to the other end side of the body in the axial direction, so as to rotatably support the rotation shaft; and
   a first cover member connected to the one end side of the body and a second cover member connected to the other end side of the body,
   wherein the body comprises a first bearing holder embedded in the one end side and a second bearing holder pressed into the other end side, the first bearing is fit and fixed to the first bearing holder, and the second bearing is fit and fixed to the second bearing holder.

2. The rotation driving device as claimed in claim 1, wherein the rotation shaft comprises a connection part outside the first bearing in the axial direction, and
   the rotation driving device further comprises a deceleration unit provided between the first cover member and the body, and connected to the connection part to decelerate a speed of the rotation shaft.

3. The rotation driving device as claimed in claim 1, wherein the first bearing holder comprises a first limiting part limiting a movement of the first bearing toward an outer side in the axial direction, and
   the second bearing holder comprises a second limiting part limiting a movement of the second bearing toward the outer side in the axial direction.

4. The rotation driving device as claimed in claim 2, further comprising:
   a first washer, provided in adjacency with the first bearing to apply an urging force to the rotation shaft in the axial direction; and
   a second washer, provided in adjacency with the output rotation body to apply an urging force to the output rotation body in the axial direction.

5. The rotation driving device as claimed in claim 2, wherein the connection part is an eccentric shaft part rotating eccentrically around the axis, and
   the deceleration unit comprises an external gear connected to the eccentric shaft part to rotate and revolve around the axis, an internal gear partially engaged with the external gear, and an output rotation body interlocked with the external gear to rotate around the axis.

6. The rotation driving device as claimed in claim 5, wherein the internal gear is embedded and fixed to the one end side of the body.

7. The rotation driving device as claimed in claim 5, wherein the external gear is rotatably supported by the eccentric shaft part via a third bearing.

8. The rotation driving device as claimed in claim 5, wherein the output rotation body is supported to be rotatable around the axis with respect to the first cover member.

9. The rotation driving device as claimed in claim 8, wherein the output rotation body is rotatably supported by the first cover member via a bush in a cylindrical shape.

10. The rotation driving device as claimed in claim 5, wherein the external gear comprises a first disc part in which external teeth engaged with the internal gear and a first engagement part engaged with the output rotation body are formed and a first cylindrical part integrally formed with the first disc part,
    the first disc part is provided in adjacency with a wall surface of the body on the one end side, and
    the first cylindrical part is formed to protrude outward from the first disc part in the axial direction.

11. The rotation driving device as claimed in claim 10, wherein the output rotation body comprises a second disc part which is provided in adjacency with the first disc part of the external gear in the axial direction and in which a second engagement part engaged with the first engagement part is formed, and a second cylindrical part integrally formed with the second disc part and provided to surround a periphery of the first cylindrical part.

12. The rotation driving device as claimed in claim 11, wherein the first engagement part is a protrusion part protruding outward in the axial direction, and
    the second engagement part is an insertion hole into which the protrusion part is movably inserted.

13. The rotation driving device as claimed in claim 11, wherein the output rotation body comprises an output part rotating around the axis and connected to outside.

14. The rotation driving device as claimed in claim 13, wherein the output part is fixed in adjacency to an outer side of the second cylindrical part in the axial direction.

15. The rotation driving device as claimed in claim 13, wherein the output part is formed on an outer circumference of the second cylindrical part.

16. The rotation driving device as claimed in claim 1, wherein a detected part is fixed to the rotation shaft in a region outside the second bearing in the axial direction, and
    the rotation driving device further comprises a circuit substrate which is provided between the second cover member and the body, and in which a detection sensor detecting a rotation position of the rotation shaft via the detected part and a control circuit controlling driving of the motor are mounted.

* * * * *